United States Patent [19]

Yoshimura

[11] Patent Number: 4,885,648
[45] Date of Patent: Dec. 5, 1989

[54] CASSETTE TAPE RECORDER HAVING A TAPE CASSETTE EJECTOR AND HEAD SHIFTER WITH COMMON DRIVE MECHANISM

[75] Inventor: Toshio Yoshimura, Kawasaki, Japan
[73] Assignee: Tanashin Denki Co., Ltd., Tokyo, Japan
[21] Appl. No.: 178,350
[22] Filed: Apr. 6, 1988
[30] Foreign Application Priority Data Nov. 25, 1987 [JP] Japan .................. 62-298610

[51] Int. Cl.⁴ ............................................. G11B 15/00
[52] U.S. Cl. ................................. 360/96.5; 360/105
[58] Field of Search .................. 360/96.5, 105, 90, 93, 360/96.6

[56] References Cited

U.S. PATENT DOCUMENTS 4,723,236 2/1988 Kitami ............................ 360/96.5
4,772,970 9/1988 Sato et al. ...................... 360/96.5

FOREIGN PATENT DOCUMENTS 0005470 1/1986 Japan.
0016060 1/1986 Japan.

Primary Examiner—Stuart N. Hecker
Assistant Examiner—David J. Severin
Attorney, Agent, or Firm—Wegner & Bretschneider

[57] ABSTRACT

A cassette tape recorder wherein a tape cassette ejecting mechanism and a magnetic head shifting mechanism are alternatively driven by a common driving mechanism of a simple construction including a tape feeding drive motor. The tape recorder includes a selectively engaging mechanism which operates by a predetermined amount when actuated, and a driving force transmitting member which is operated by the selectively engaging mechanism and moved between first and second positions by a head holding mechanism. When a tape cassette is to be ejected, the driving force transmitting member is moved to the first position in which it operates an ejecting mechanism. When a tape cassette is loaded into an operative position, the driving force transmitting member is moved to the second position in which it operates a head shifting mechanism to shift a magnetic head and a pinch roller to their operative positions at which they are thereafter held by the head holding mechanism. When the tape recorder is to be stopped, the head shifting mechanism is released from the head holding mechanism and returns to its inoperative position.

13 Claims, 15 Drawing Sheets

CASSETTE TAPE RECORDER HAVING A TAPE CASSETTE EJECTOR AND HEAD SHIFTER WITH COMMON DRIVE MECHANISM

BACKGROUND OF THE INVENTION

1. Field of the Invention

This invention relates to a cassette type tape recorder wherein ejecting motion and head shifting motion are both effected making use of a turning force of a tape feeding drive motor.

2. Description of the Prior Art

A cassette tape recorder wherein the turning force of a tape feeding drive motor utilized to eject a tape cassette is already known and disclosed, for example, by Japanese Patent Laid-Open No. 61-5470. The tape recorder disclosed includes a tape feeding mechanism, a tape feeding drive motor, a rotation transmitting mechanism for transmitting the turning force of the tape feeding drive motor to the tape feeding mechanism, an ejecting mechanism for moving a tape cassette from an operative position to a removing position, a selectively engaging mechanism for selectively engaging with the rotation transmitting mechanism to receive the turning force of the tape feeding drive motor via the rotation transmitting mechanism to make a motion by a fixed amount, a driving force transmitting member for transmitting the moving force of the selectively engaging mechanism to the ejecting mechanism, and a trigger mechanism for engaging the selectively engaging mechanism with the rotation transmitting mechanism. As the trigger mechanism is rendered operative, the turning force of the tape feeding drive motor is transmitted to cause the ejecting mechanism to make a tape cassette ejecting operation.

Another tape recorder is disclosed in Japanese Laid-Open Patent No. 61-16060. In the tape recorder, when a main power source switch or an operation switch is turned off, a head panel is retracted from an operative position to a stand-by position by the biasing force of a spring in order to minimize deformation of a pinch roller which may be caused by a mutually pressing action between the pinch roller and a capstan shaft, and when the switch is turned on, the head panel is moved from the stand-by position to the operative position against the biasing force of the spring by an action of a cam which is rotated by the turning force of a tape feeding drive motor.

In this manner, a conventional cassette tape recorders may be either of the type which includes a mechanism for ejecting a tape cassette making use of the turning force of a tape feeding drive motor or of the type which includes a mechanism for causing a head shifting motion making use of the turning force of a tape feeding drive motor. However, a conventional cassette tape recorder has never been provided so far which includes both of such mechanisms and its appearance is expected.

By the way, if both of such mechanisms are merely incorporated in a single cassette tape recorder, it will give rise to several problems. For example, the overall size of the tape recorder will increase and the weight will also increase; and its construction will be complicated and the number of parts will also increase, involving an increase in production cost.

SUMMARY OF THE INVENTION

It is an object of the present invention to provide a cassette tape recorder wherein a tape cassette ejecting mechanism and a magnetic head shifting mechanism are alternatively driven by a common driving mechanism including a tape feeding drive motor.

It is another object of the present invention to provide a cassette tape recorder wherein a mechanism for alternatively driving a tape cassette ejecting mechanism and a magnetic head shifting mechanism can be produced with a relatively small amount of parts at a relatively low cost.

In order to attain the object, according to the present invention, there is provided a cassette tape recorder which comprises a tape feeding mechanism, a tape feeding drive motor, a rotation transmitting mechanism for transmitting the turning force of the tape feeding drive motor to the tape feeding mechanism, an ejecting mechanism for moving a tape cassette from an operative position to an unloading position, a selectively engaging mechanism for selectively engaging with the rotation transmitting mechanism to operate by a predetermined amount by the turning force of the tape feeding drive motor, a driving force transmitting member for transmitting the operating force of the selectively engaging mechanism to the ejecting mechanism, a trigger mechanism for operating the selectively engaging mechanism to engage with the rotation transmitting mechanism, a head shifting mechanism for shifting a magnetic head and a pinch roller from respective inoperative to operative positions, a head holding mechanism including a head holding electromagnet for holding the magnetic head and the pinch roller at the respective operative positions, the driving force transmitting member being alternatively movable between a first position in which it engages with the ejecting mechanism and a second position in which it engages with the head shifting mechanism, means for receiving a tape cassette thereon and for moving the received tape cassette from the unloading to the operative position, the head holding mechanism and the trigger mechanism being rendered operative in response to loading of a tape cassette to the operative position so that the driving force transmitting member is moved to the second position by the head holding mechanism and the selectively engaging mechanism is engaged with the rotation transmitting mechanism by the trigger mechanism thereby to operate the head shifting mechanism to move the magnetic head and the pinch roller to the respective operative positions at which the magnetic head and the pinch roller are thereafter held by the head holding mechanism, an ejection initiating means for rendering the head holding electromagnet inoperative to cancel holding of the head shifting mechanism by the head holding mechanism and to move the driving force transmitting member to the first position and for simultaneously rendering the trigger mechanism operative to engage the selectively engaging mechanism with the rotation transmitting mechanism, and a stopping signaling means for rendering the head holding electromagnet inoperative to cancel holding of the head shifting mechanism by the head holding mechanism.

With the cassette tape recorder, if a tape cassette is loaded to the operative position, the head holding mechanism is rendered operative so that the driving force transmitting member is moved to the second position by the head holding mechanism, and simultaneously the trigger mechanism is rendered operative so that the selectively engaging mechanism is engaged with the rotation transmitting mechanism. Consequently, the selectively engaging mechanism is operated by the predetermined amount by the selectively engaging mechanism. The operation of the selectively engaging mechanism by the predetermined amount is transmitted via the driving force transmitting member to the head shifting mechanism so that the head shifting mechanism shifts the magnetic head and the pinch roller from the inoperative to the operative positions. After then, the magnetic head and the pinch roller are held at the operative positions by the head holding mechanism until the head holding electromagnet is deenergized.

If the ejection initiating means is operated in order to eject a tape cassette, the trigger mechanism is rendered operative so that the selectively engaging mechanism is engaged with the rotation transmitting mechanism, and simultaneously the head holding electromagnet is rendered inoperative so that the driving force transmitting member is moved back to the first position. Consequently, the turning force of the tape feeding driving motor is transmitted via the driving force transmitting member to the ejecting mechanism thereby to effect an ejecting operation. Meanwhile, the head shifting mechanism is released from the head holding mechanism and thus shifts the magnetic head and the pinch roller from the operative positions back to the inoperative positions.

If the stopping signaling means is operated to stop operation of the entire tape recorder, the head holding electromagnet is rendered inoperative so that the head shifting mechanism is released from the head holding mechanism and thus shifts the magnetic head and the pinch roller from the operative positions back to the inoperative positions.

In this manner, with the tape recorder of the present invention, a single motion transmitting system can be used both to eject a tape cassette and to shift the magnetic head and the pinch roller to the inoperative position while a tape cassette is held at the operative position. Accordingly, the tape recorder is provided with increased functions without having a complicated construction.

The above and other objects, features and advantages of the present invention will become apparent from the following description and the appended claims, taken in conjunction with the accompanying drawings.

DESCRIPTION OF THE PREFERRED EMBODIMENTS

Figure 1:
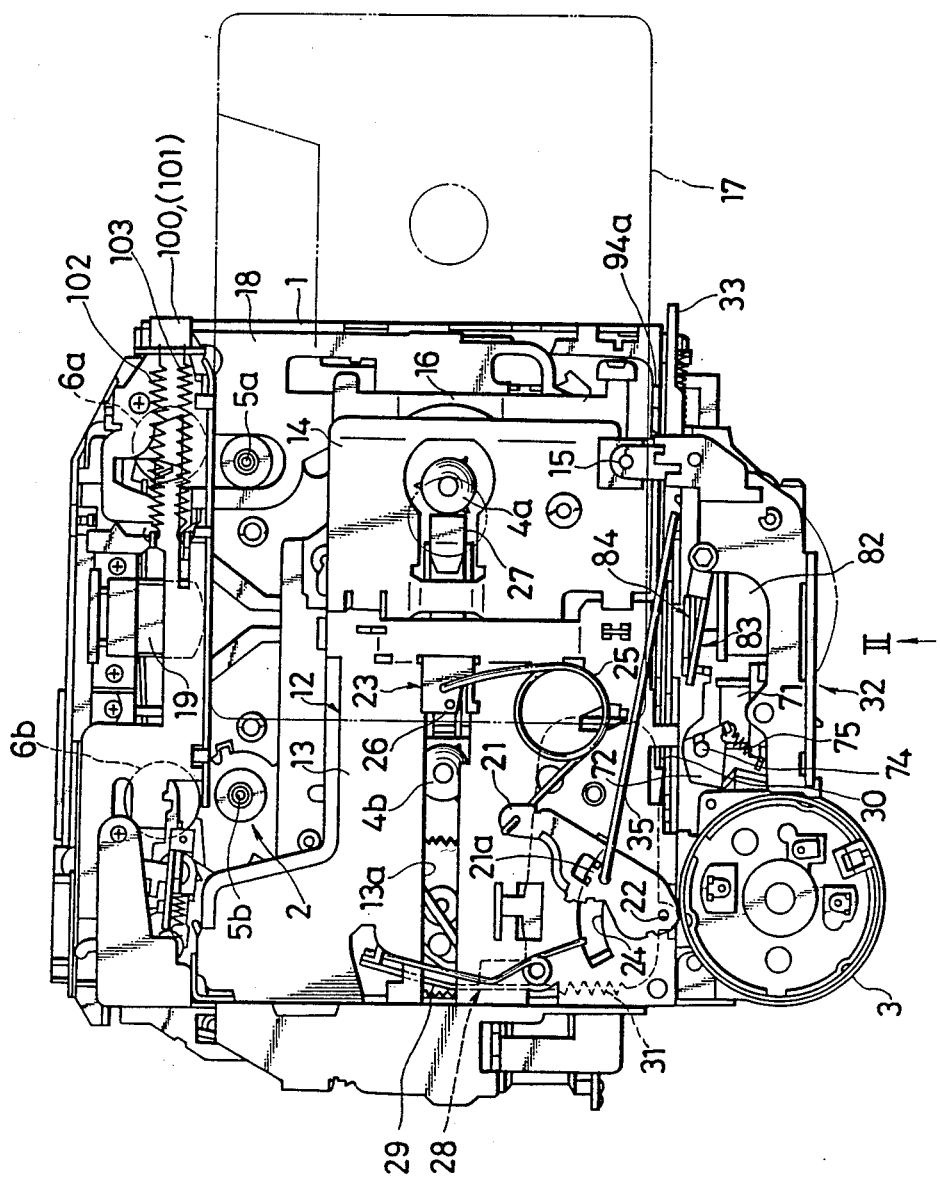
FIG. 1 is a top plan view of a mechanism of a tape recorder in a rest condition showing a preferred embodiment of the present invention.

Referring first to FIG. 1, a cassette tape recorder shown includes a tape feeding mechanism 2 and a tape feeding drive motor 3 both provided on the upper face side of a main base plate 1. The tape feeding mechanism 2 includes a pair of reel shafts 4a and 4b, a pair of capstan shafts 5a and 5b and a pair of pinch rollers 6a and 6b. The turning force of the tape feeding drive motor 3 is transmitted to the tape feeding mechanism 2 by way of a rotation transmitting mechanism 7 provided on the other or lower face side of the main base plate 1.

Figure 3:
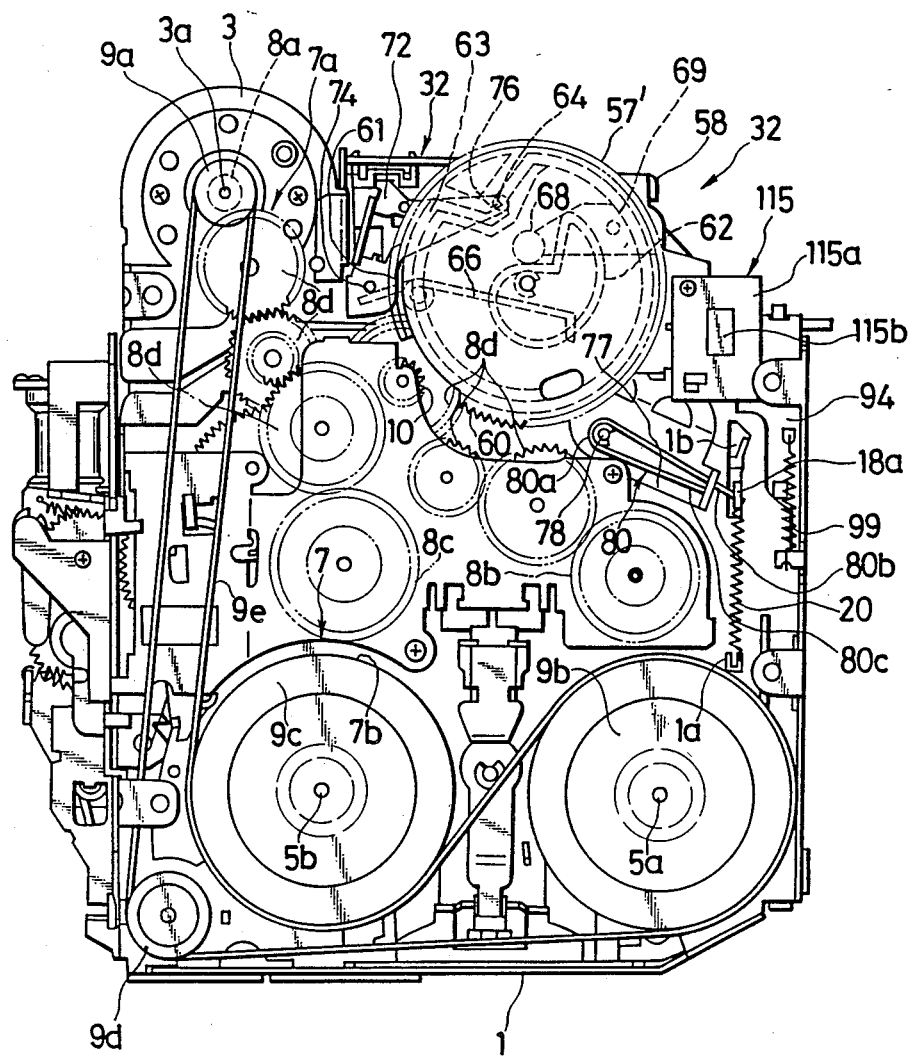
FIG. 3 is a bottom plan view of the tape recorder mechanism of FIG. 1.

Referring now to FIG. 3, the rotation transmitting mechanism 7 includes a reel shaft side section 7a which connects the tape feeding drive motor 3 to the reel shafts 4a and 4b, and a capstan shaft side section 7b which connects the tape feeding drive motor 3 to the capstan shafts 5a and 5b. The reel shaft side section 7a includes a motor gear 8a of a small diameter securely mounted on a rotary shaft 3a of the tape feeding drive motor 3, a pair of reel shaft gears 8b and 8c mounted on the reel shafts 4a and 4b, respectively, and an intermediate gear train including several gears 8d interposed between the motor gear 8a and the reel shaft gears 8b and 8c. The capstan shaft side section 7b includes a motor pulley 9a of a small diameter securely mounted on the rotary shaft 3a of the motor 3, first and second fly-wheels 9b and 9c in the form of pulleys of a large diameter secured to lower ends of the capstan shafts 5a and 5b, respectively, a guide pulley 9d supported for rotation at a corner portion of the lower face of the main base plate 1, and an endless belt 9e extending around and between the motor pulley 9a, first and second fly-wheels 9b and 9c and guide pulley 9d. When the motor 3 rotates, the capstan shafts 5a and 5b are rotated simultaneously in respective tape feeding directions while the reel shafts 4a and 4b are alternatively rotated in their respective tape winding directions.

Figure 2:
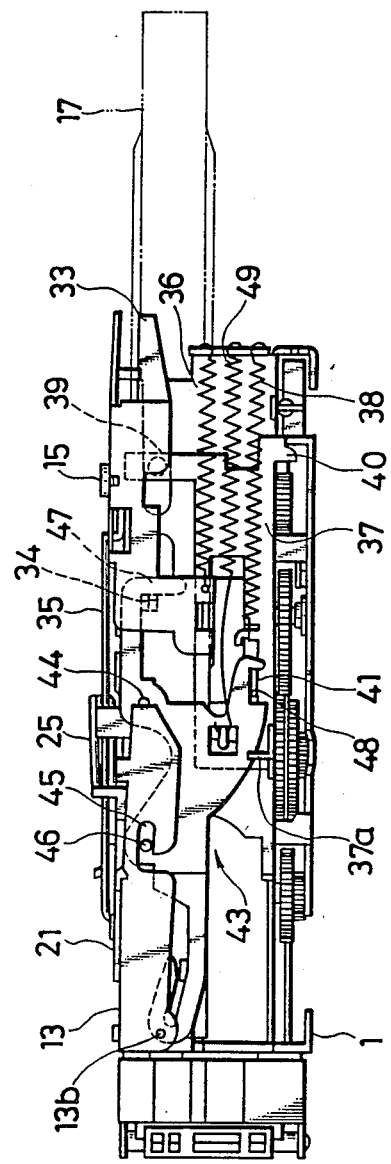
FIG. 2 is an elevational view as viewed in the direction of an arrow mark II of FIG. 1.

Referring to FIGS. 1 and 2, a cassette holder 12 is mounted on the upper face of the main base plate 1. The cassette holder 12 includes a pivotal plate 13 mounted for pivotal motion within a predetermined range in up and down directions, that is, in a direction perpendicular to the plane of FIG. 1 around an axis 13b at a left end portion in FIG. 1 of the pivotal plate 13. The cassette holder 12 further includes a cassette inserting member 14 mounted for pivotal motion within a predetermined range in up and down directions, that is, in a direction perpendicular to the plane of FIG. 1 around an axis provided by a right end edge in FIG. 1 of the pivotal plate 13. The lower limit position of pivotal motion of the pivotal plate 13 is provided by the base plate 1 which engages with a bottom face of the pivotal plate 13 while the upper limit position is provided by a stop 15 formed at an upper portion of a side wall 1c of the main base plate 1. When the pivotal plate 13 contacts with the stopper 15, the pivotal plate 13 and the cassette inserting member 14 are held in respective positions substantially parallel to the main base plate 1 as seen in FIG. 2.

The cassette inserting member 14 has a cassette inserting and removing opening 16 formed on the right end side thereof in FIG. 1. When the pivotal plate 13 is at its upper limit position, a tape cassette 17 can be inserted into and removed from the cassette inserting member 14 in the leftward or rightward direction in FIG. 1 through the cassette inserting and removing opening 16. The upper limit position of the pivotal plate 13 and hence of the cassette holder 12 will thus be hereinafter referred to as cassette unloading position. After a tape cassette 17 is fully inserted into the cassette inserting member 14, the pivotal plate 13 is pivoted to the lower limit position together with the tape cassette 17 so that the tape cassette 17 is loaded into a predetermined operative position in which it is received by the reel shafts 4a and 4b and the capstan shafts 5a and 5b. The lower limit position of the pivotal plate 13 and hence of the cassette holder 12 will thus be hereinafter referred to as cassette operating position.

A head panel 18 is mounted on the upper face of the main base plate 1 for reciprocal motion within a predetermined range in up and down directions in FIG. 1, that is, in a direction perpendicular to the direction of insertion or removal of a tape cassette 17, and a recording/reproducing magnetic head 19 is mounted on an upper face of the head panel 18. When the head panel 18 moves forwardly or backwardly, that is, in the downward or upward direction in FIG. 1, the magnetic head 19 is brought into or out of contact with a magnetic tape not shown within a tape cassette 17 loaded in the operative position. The head panel 18 is normally biased to move the magnetic head 19 thereon away from the magnetic tape, that is, in the upward direction in FIG. 1 by a tension coil spring 20. Referring to FIG. 3, the spring 20 is located below the main base plate 1 and has one end anchored by a spring anchoring bent lug 1a formed on the main base plate 1 and the other end anchored by another spring anchoring bent lug 18a formed on the head panel 18. The spring anchoring bent lug 18a of the head panel 18 is fitted for movement in an elongated hole 1b of the main base plate 1.

A head shifting mechanism which will be hereinafter described is connected to the head panel 18. When the magnetic head 19 is moved forwardly to its operative position in which it contacts with the magnetic tape in the tape cassette 17 together with the head panel 18 by the head shifting mechanism, the pinch roller 6a or 6b on the same side as that one of the reel shafts 4a and 4b which is currently being driven by the motor 3 follows such forward movement of the magnetic head 19 until it moves to its operative position in which it contacts with the capstan shaft 5a or 5b on the same side. When the right side reel shaft 4a, for example, is being driven, the right side pinch roller 6a will be brought into contact with the right side capstan shaft 5a with the magnetic tape interposed therebetween so that the magnetic tape will thereafter be fed in the rightward or leftward direction in FIG. 1. During feeding of the magnetic tape, recording on or reproducing from the magnetic tape is performed as in a conventional tape recorder. The position of the head panel 18 in which the magnetic head 19 contacts with the magnetic tape in a tape cassette loaded in the operative position will thus be hereinafter referred to as operative position while the position in which the magnetic head 19 is spaced away from the magnetic tape will be hereinafter referred to as inoperative position.

A spring receiving member 21 is supported at one end thereof for pivotal motion by means a shaft 22 on an upper face of the pivotal plate 13. A slider 23 is mounted for sliding movement in the tape cassette inserting and removing directions in an elongated hole 13a of the pivotal plate 13. The pivotal end of the spring receiving member 21 is substantially directed toward the slider 23, and an intermediate bent lug 21a of the spring receiving member 21 is fitted in an arcuate hole 24 perforated in the pivotal plate 13 so that the range of pivotal motion of the spring receiving member 21 is restricted by the opposite ends of the arcuate hole 24. A spring 25 in the form of a torsion coil spring is connected between the slider 23 and the pivotal end of the spring receiving member 21.

The slider 23 has at one end thereof (at the left end in FIG. 1) an abutting wall 26 for abutting with a tape cassette 17 when the tape cassette 17 is inserted into the cassette inserting member 14 to its unloading position. The slider 23 has at the other end thereof an engaging pawl 27 for engaging with one of reel hub holes not shown of a tape cassette 17 when the tape cassette 17 is inserted into the cassette inserting member 14.

An arresting member 28 in the form of a plate is mounted on the lower face of the pivotal plate 13 for pivotal motion within a predetermined range in a coaxial relationship with the spring receiving member 21. The arresting member 28 has an abutting tab 29 located on an operation line of the slider 23. The arresting member 28 further has an arresting portion 30 for selectively engaging with an upper edge of the side wall 1c of the main base plate 1 to arrest the cassette holder 12 at the cassette operating position. The arresting member 28 is biased to pivot to bring the arresting portion 30 thereof into arresting engagement with the upper edge of the side wall 1c of the main base plate 1 by a tension coil spring 31.

An ejecting and head shifting operating unit 32 is provided on a side portion (a lower side portion in FIG. 1) of the main base plate 1. The unit 32 will be hereinafter described.

Referring to FIG. 2, an ejecting operating member or eject lever 33 is mounted for movement within a predetermined range in the leftward and rightward directions in FIGS. 1 and 2 on an outer face of the side wall 1c of the main base plate 1. The ejecting operating member 33 is provided for moving a tape cassette 17 from the operative position to the unloading position. An engaging bent lug 34 is formed at a left end portion of the ejecting operating member 33. The ejecting operating member 33 is connected to the spring receiving member 21 by way of a connecting link 35 and normally biased in the rightward returning direction by a tension coil spring 36. When the ejecting operating member 33 is moved in the rightward direction in FIGS. 1 and 2 by the biasing force of the spring 36, the spring receiving member 21 is pivoted in the clockwise returning direction in FIG. 1 via the connecting link 35, and on the contrary when the ejecting operating member 33 moves in the leftward advancing direction against the biasing force of the spring 36, the spring receiving member 21 is pivoted in the counterclockwise advancing direction via the connecting link 35.

An operating force transmitting member 37 is mounted for movement within a predetermined range in the leftward and rightward directions in FIG. 2 at a location below the ejecting operating member 33 on the outer face of the side wall 1c of the main base plate 1. The operating force transmitting member 37 is normally biased in the rightward direction by a tension coil spring 38 in FIG. 2. When the ejecting operating member 33 moves in the leftward direction in FIG. 2, the operating force transmitting member 37 receives, at a pressure receiving portion 39 thereof, the pressing force of the ejecting operating member 33 so that it is moved in the leftward direction in an integral relationship by the ejecting operating member 33. The operating force transmitting member 37 has a switch operating tab 40 and an engaging bent lug 41 formed thereon. The switch operating tab 40 is located for operation of a tape judging switch 115 (see FIG. 3) which is provided for judging whether the type of the magnetic tape of the tape cassette 17 inserted into the cassette holder 12 is a normal tape or a chrome tape to cause change-over of an electric circuit of the tape recorder so that the electric circuit may operate in conformity with a normal tape or a chrome tape. The tape judging switch 115 is one of components of the ejecting and head shifting unit 32, and details thereof will be hereinafter described.

An interlocking member 43 is mounted for pivotal motion within a predetermined range around a shaft 44 at a location on the outer face of the side wall 1c of the main base plate 1 leftwardly in FIG. 2 of the ejecting operating member 33 and the operating force transmitting member 37. An engaging pin 46 is mounted on the interlocking member 43 and held in sliding engagement with an elongated hole or slot 45 formed in a side wall of the pivotal plate 13 of the cassette holder 12. The interlocking member 43 has a depending pressure receiving lug 47 formed thereon for engaging with the engaging bent lug 34 of the ejecting operating member 33 to receive the pressing force of the ejecting operating member 33. The interlocking member 43 further has a recess 48 formed thereon for engaging with the engaging bent lug 41 of the operating force transmitting member 37. The interlocking member 43 is normally biased in the clockwise direction in FIG. 2 by a tension coil spring 49.

Figure 6:
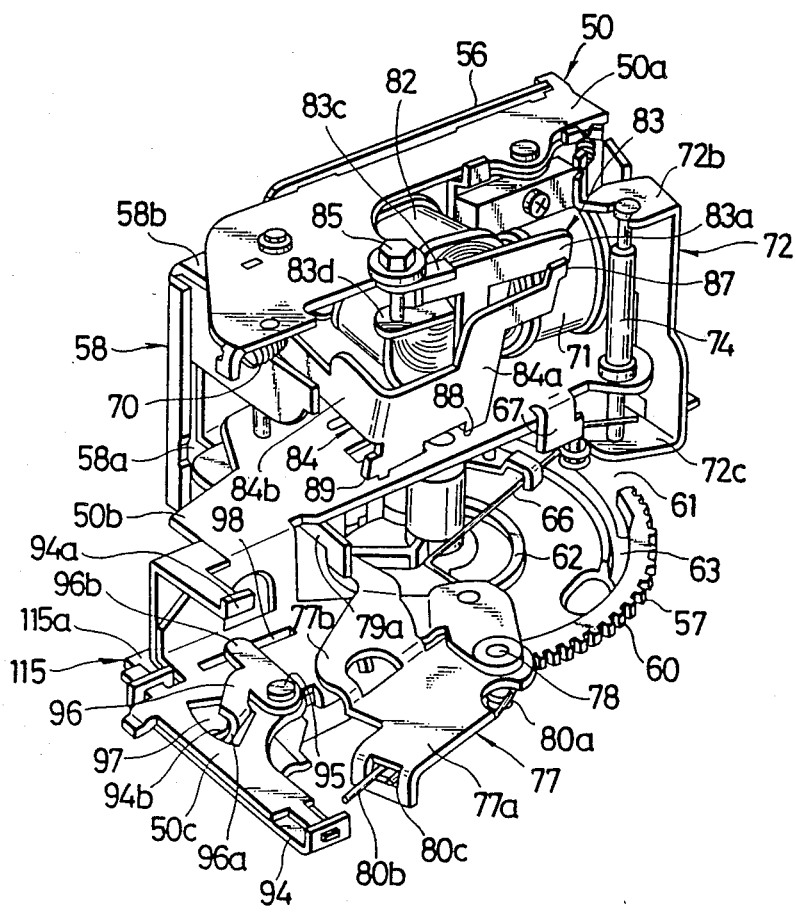
FIG. 6 is a perspective view of an ejecting operating unit in an assembled condition.
Figure 7:
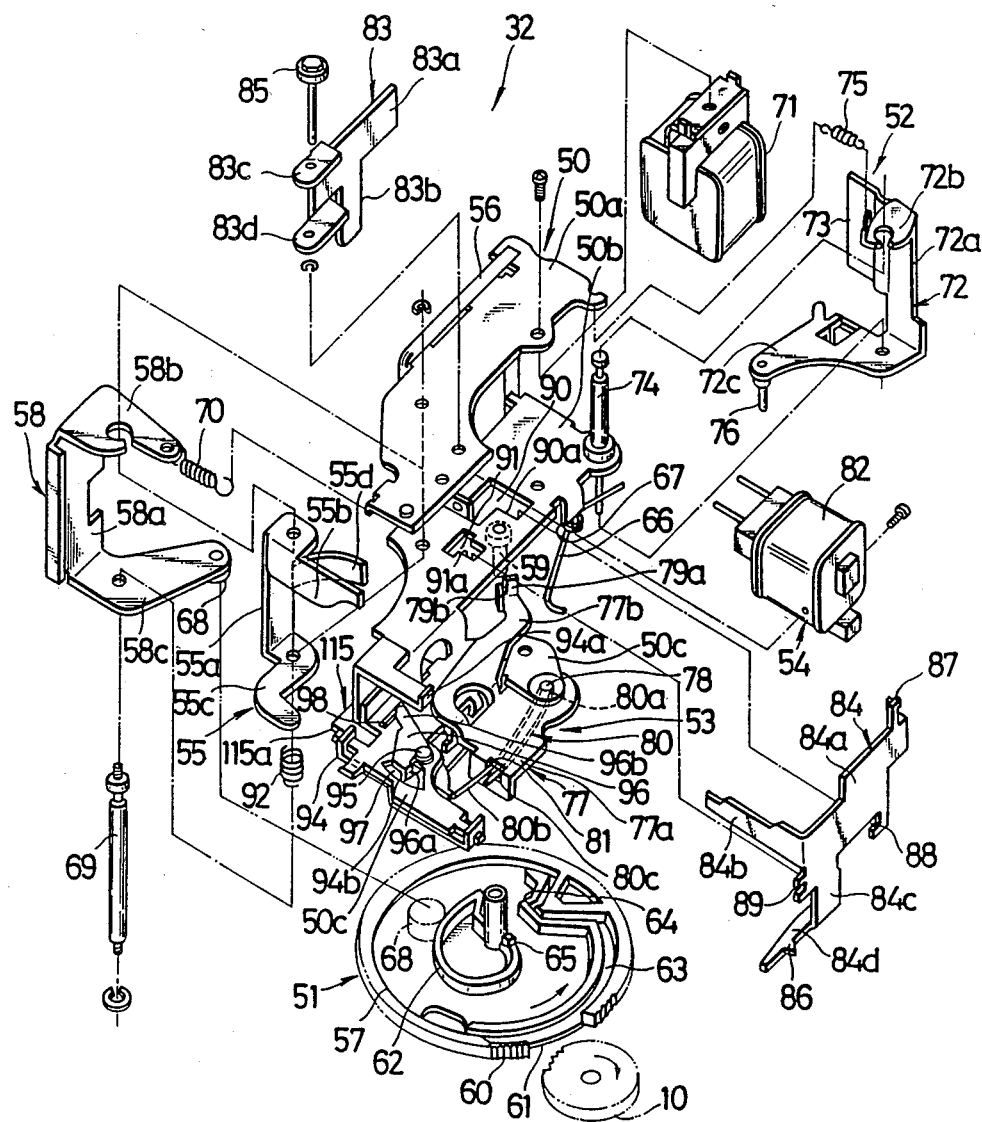
FIG. 7 is a fragmentary perspective view of the ejecting operating unit of FIG. 6.

Referring now to FIGS. 6 and 7, the ejecting and head shifting operating unit 32 is particularly shown. The unit 32 includes a unit base plate 50 including an upper base plate 50a, an intermediate base plate 50b and a lower base plate 50c. Mounted on the unit base plate 50 are a selectively engaging mechanism 51, a trigger mechanism 52, a head shifting mechanism 53, a head holding mechanism 54, a driving force transmitting member 55, a printed circuit board 56 and a change-over switch 42 (see FIGS. 14 to 18).

The selectively engaging mechanism 51 is selectively engaged with the rotation transmitting mechanism 7 to receive the turning force of the tape feeding drive motor 3 via the rotation transmitting mechanism 7 thereby to operate by a predetermined amount by the turning force of the tape feeding drive motor 3. The selectively engaging mechanism 51 includes a driving gear 57 and a first pivotal member 58.

The driving gear 57 is supported for rotation within a plane by means of a shaft 59 at a substantially central portion of a lower face of the intermediate base plate 50b of the unit base plate 50. The driving gear 57 has a recessed portion 61 formed at part of a toothed portion 60 of the outer periphery thereof.

The driving gear 57 is located for meshing engaging at the toothed portion 60 thereof with a rotation transmitting gear 10 which is mounted for coaxial integral rotation with one of the intermediate gears 8d of the reel shaft side section 7a of the rotation transmitting mechanism 7. When the toothed portion 60 of the driving gear 57 is meshed with the rotation transmitting gear 10, the rotation transmitting mechanism 7 is engaged with the driving gear 57. To the contrary, when the recessed portion 61 of the driving gear 57 is positioned in an opposing relationship to the outer periphery of the transmitting gear 10 and hence the toothed portion 60 does not mesh with the rotation transmitting gear 10, the rotation transmitting mechanism 7 is disengaged from the driving gear 57.

The driving gear 57 has a spiral cam 62 formed at a central portion of an upper face thereof and a cam groove 63 formed at an outer circumferential portion of the upper face thereof. The spiral cam 62 has a peripheral cam face which extends such that the distance thereof from the center of rotation of the driving gear 57 gradually increases as the rotational angle increases during about one full rotation of the driving gear 57 in one direction, that is, in the counterclockwise direction as indicated by an arrow mark in FIG. 7 from an initial position wherein the driving gear 57 connects to the rotation transmitting mechanism 7. An arresting shoulder 64 is formed alongside the cam groove 63 of the driving gear 57 while a pressure receiving projection 65 is formed on an upper face of the spiral cam 62. A torsion coil spring 66 engages at one end portion thereof with the pressure receiving projection 65 of the driving gear 57 and has, at a substantially central location thereof, a coiled portion which is fitted on a holding lug 67 of the intermediate base plate 50b of the unit base plate 50. The other end of the torsion coil spring 66 engages with a vertical shaft 74 on which a first movable member 72 which will be hereinafter described is supported. Thus, the driving gear 57 is biased at the pressure receiving projection 65 thereon by the spring 66 so that it may be returned to its initial position in which it engages with the rotation transmitting mechanism 17.

The first pivotal member 58 has a substantially channel shape in side elevation including an intermediate vertical wall 58a and a pair of upper and lower horizontal walls 58b and 58c and is mounted for pivotal motion within a predetermined range within a horizontal plane by means of a shaft 69 on the unit base plate 50 with the upper horizontal wall 58b thereof located just below the upper base plate 50a of the unit base plate 50 and with the lower horizontal wall 58c thereof located below the intermediate base plate 50b. A cam roller 68 is supported for rotation on a lower face at an end of the lower horizontal wall 58c of the first movable member 58 and normally held in sliding contact with the peripheral cam face of the spiral cam 62 of the driving gear 57. The first movable member 58 is normally biased in a direction to contact the cam roller 68 thereon with the cam face of the spiral cam 62 by a tension coil spring 70. The spring 70 extends between an end of the upper horizontal wall 58b of the first movable member 58 and the upper base plate 50a of the unit base plate 50. When the driving gear 57 rotates in the counterclockwise direction in FIG. 7 from its initial position, the first pivotal member 58 is pivoted in the counterclockwise direction in FIG. 7 against the biasing force of the spring 70 through sliding contact between the cam face of the spiral cam 62 of the driving gear 57 and the cam roller 68 on the first pivotal member 58.

The trigger mechanism 52 is provided for engaging the selectively engaging mechanism 51 with the rotation transmitting mechanism 7 and includes a trigger canceling electromagnet 71 and the first movable member 72 mentioned hereinabove.

The trigger canceling electromagnet 71 is mounted between the upper base plate 50a and the intermediate base plate 50b of the unit base plate 50 and electrically connected to predetermined terminals not shown of the printed circuit board 56. Details of an electric circuit including the printed circuit board 56 and the trigger canceling electromagnet 71 will be hereinafter described.

The first movable member 72 has a channel shape in side elevation having an intermediate vertical wall 72a and a pair of upper and lower horizontal walls 72b and 72c. The intermediate vertical wall 72a of the first movable member 72 has a sideward extension 73 the trigger canceling electromagnet 71. The first movable member 72 is mounted for pivotal motion within a predetermined range by means of the vertical shaft 74 on the unit base plate 50 with the intermediate base plate 50b of the unit base plate 50 located between the upper and lower horizontal walls 72b and 72c thereof.

Figure 8:
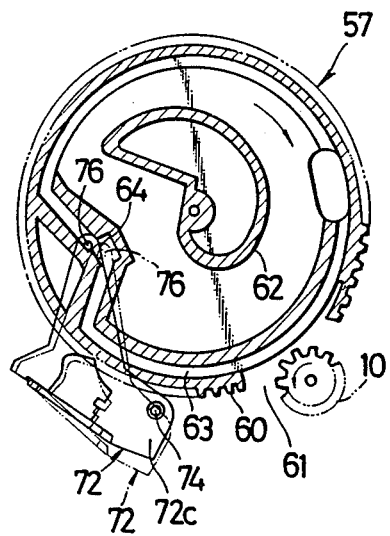
FIG. 8 is an enlarged sectional view showing a driving gear of the ejecting operating unit of FIG. 6.

The first movable member 72 is normally biased in one direction to move the attracted element 73 away from the trigger canceling electromagnet 71, that is, in the clockwise direction in FIGS. 6 to 8 by a tension coil spring 75. An arresting pin 76 is mounted at an end of a lower face of the lower horizontal wall 72c of the first movable member 72 and received in sliding engagement in the cam groove 63 of the driving gear 57. As the arresting pin 76 is arrested by the arresting shoulder 64 of the cam groove 63 as shown in FIG. 8, the driving gear 57 is held against the biasing force of the spring 66 at an inoperative position wherein it is disengaged from the rotation transmitting mechanism 7.

If the trigger canceling electromagnet 71 is energized, the attracted element 73 of the first movable member 72 is attracted to the electromagnet 71 to pivot the first movable member 72 in the other direction, that is, in the counterclockwise direction in FIG. 8 against the biasing force of the spring 75 whereupon the arresting engagement between the arresting pin 76 and the arresting shoulder 64 of the cam groove 63 is canceled to allow the driving gear 57 to be angularly rotated by the biasing force of the spring 66. Consequently, the driving gear 57 is engaged with the rotation transmitting mechanism 7 by way of the rotation transmitting gear 10.

Figure 9:
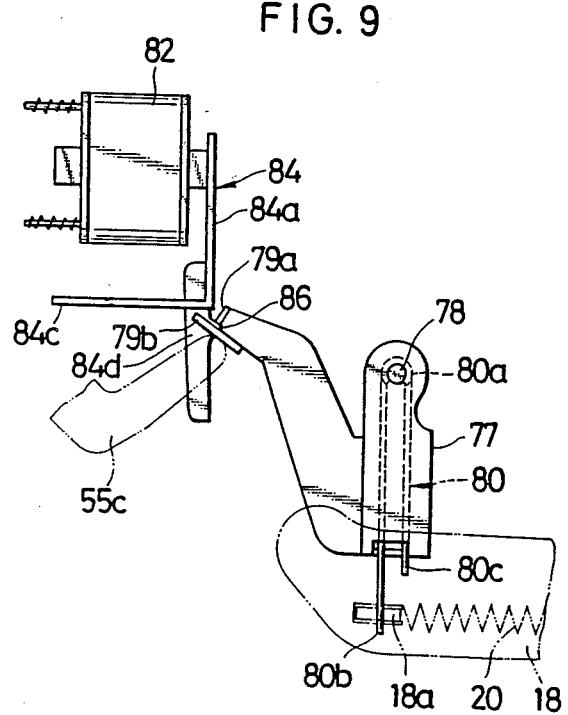
FIG. 9 is an enlarged top plan view of a head panel shifting member of the ejecting operating unit of FIG. 6.

The head shifting mechanism 53 includes a head panel shifting member 77 in the form of a plate having an arm 77b extending contiguously from a side of a main body 77a thereof. The head panel shifting member 77 is mounted at an end portion of the main body 77a thereof for pivotal motion within a predetermined range within a horizontal plane by means of a shaft 78 on the lower base plate 50c of the unit base plate 50. Referring also to FIG. 9, an engaging bent lug 79a and an abutting bent lug 79b are formed at an end of the arm 77b of the head panel shifting member 77 and located between the intermediate base plate 50b of the unit base plate 50 and the driving gear 57. A torsion coil spring 80 is located on a lower face of the head panel shifting member 77. The spring 80 has an intermediate coiled portion 80a fitted around the shaft 78 while opposite end portions 80b and 80c thereof extend through an engaging hole 81 formed in the head panel shifting member 77. The end portion 80b of the spring 80 is anchored at the spring anchoring lug 18a of the head panel 18 as shown in FIGS. 3 and 9. As the head panel shifting member 77 pivots in the counterclockwise direction in FIGS. 3 and 9, the head panel 18 is resiliently shifted to the operative position against the biasing force of the spring 20 by the spring 80 on the head panel shifting member 77.

The head holding mechanism 54 includes a head holding electromagnet 82, a second movable member 83, and a third movable member 84. The head holding electromagnetic 82 is mounted between the upper base plate 50a and the intermediate base plate 50b of the unit base plate 50 and electrically connected to predetermined terminals not shown of the printed circuit board 56. The second movable member 83 has a substantially T-shape in side elevation having a vertically elongated lower piece 83b provided contiguously to a lower side of a substantially intermediate portion of a horizontally elongated upper piece 83a. A pair of parallel brackets 83c and 83d are formed in a perpendicularly horizontally forward direction at upper and lower sides of an end of the upper piece 83a of the second movable member 83. The second movable member 83 is mounted for pivotal motion around a shaft 85 on the upper base plate 50a of the unit base plate 50 with the brackets 83c and 83d thereof located below the upper base plate 50a. The lower piece 83b of the second movable member 83 serves as an attracted element to be attracted to the head holding electromagnet 82.

The third movable member 84 has a lateral arm 84b extending contiguously in a perpendicularly horizontally rearward direction at an end portion of a main body 84a thereof. The third movable member 84 further has a connecting portion 84c extending vertically downwardly from the end portion of the main body 84a, and a horizontal engaging finger 84d extending in a perpendicular rearward direction from a lower end of the connecting portion 84c. An engaging projection 86 of a substantially triangular shape in plan is formed at a substantially intermediate portion of a front edge of the engaging finger 84d of the third movable member 84. An engaging recess or notch 87 is formed at an upper end of the main body 84a remote from the engaging finger 84d. A pair of engaging slots 88 and 89 are provided at opposite ends of a lower portion of the main body 84a of the third movable member 84. The third movable member 84 is located such that the main body 84a and the lateral arm 84b thereof are positioned between the upper base plate 50a and the intermediate base plate 50b of the unit base plate 50 and the engaging slots 88 and 89 thereof are engaged by engaging edges 90a and 91a of a pair of holes 90 and 91 formed in the intermediate base plate 50b while the connecting portion 84c and the engaging finger 84d thereof are located below the intermediate base plate 50b. With the construction, the third movable member 84 is supported for pivotal motion within a predetermined range around a fulcrum provided by a line interconnecting the engaging slots 88 and 89 such that an end of the lateral arm 84b is moved up and down. An end of the upper piece 83a of the second movable member 83 remote from the brackets 83c and 83d is received for cooperative motion in the engaging recess 87 of the third movable member 84.

Figure 4:
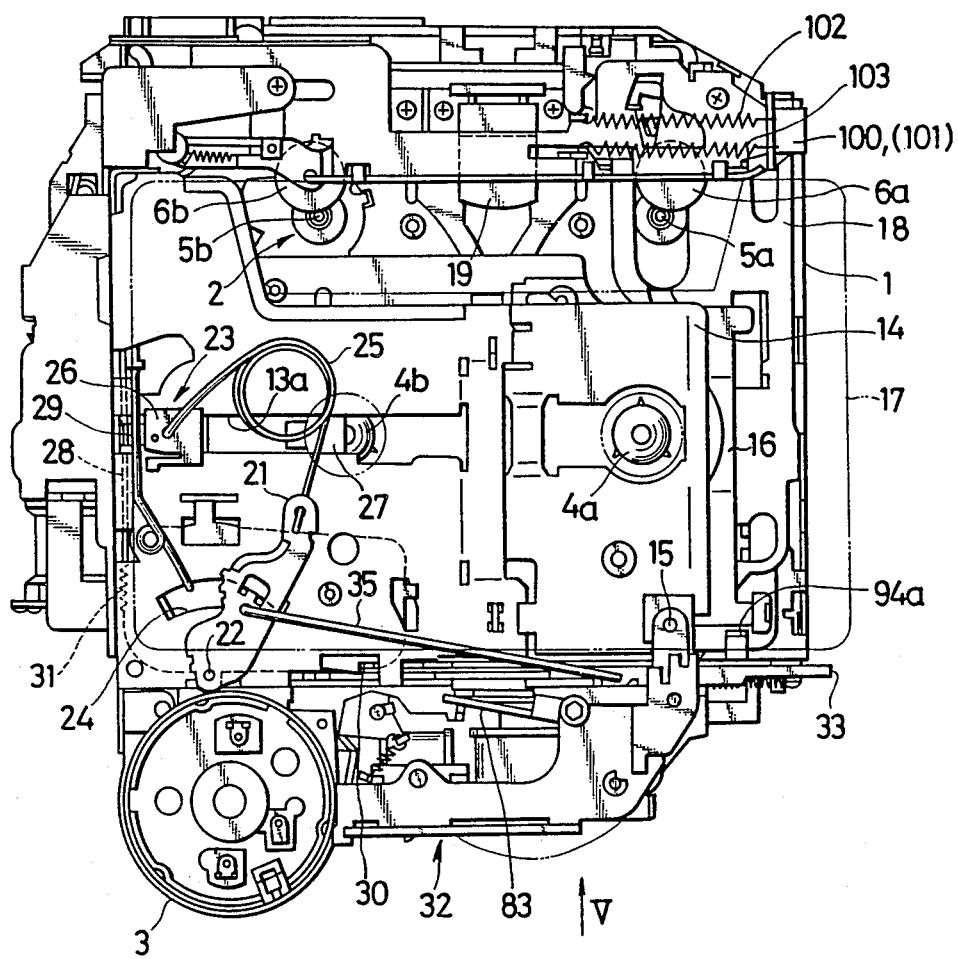
FIG. 4 is a top plan view showing the tape recorder mechanism of FIG. 1 in an operating condition.

If the head holding electromagnet 82 is energized, the lower piece 83b of the second movable member 83 is attracted to the electromagnet 82 whereupon the second movable member 83 is pivoted in the counterclockwise direction in FIG. 4 around a fulcrum provided by the shaft 85. Following the second movable member 83 through the engagement of the upper piece 83a of the second movable member 83 with the engaging recess 87 of the third movable member 84, the third movable member 84 pivots around the fulcrum provided by the engaging slots 88 and 89 thereof to move the end of the lateral arm 84b downwardly. When the third movable member 84 pivots in this manner, the engaging projection 86 thereof is engaged with the engaging lug 79a of the head panel shifting member 77 as shown in FIG. 9. Accordingly, the head panel 18 is held at its operative position until the head holding electromagnet 82 is de-energized.

Figure 10:
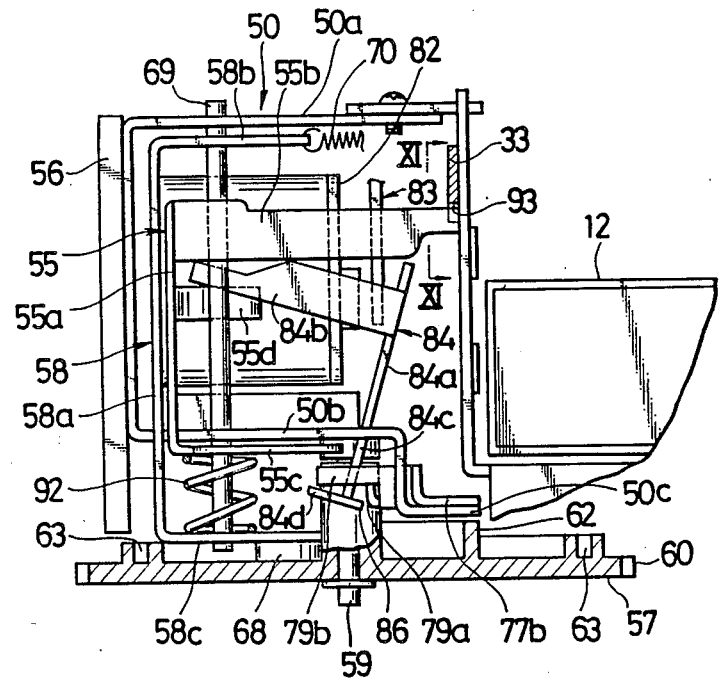
FIG. 10 is an enlarged side elevational view, partly broken, showing part of the ejecting operating unit of FIG. 6.
Figure 12:
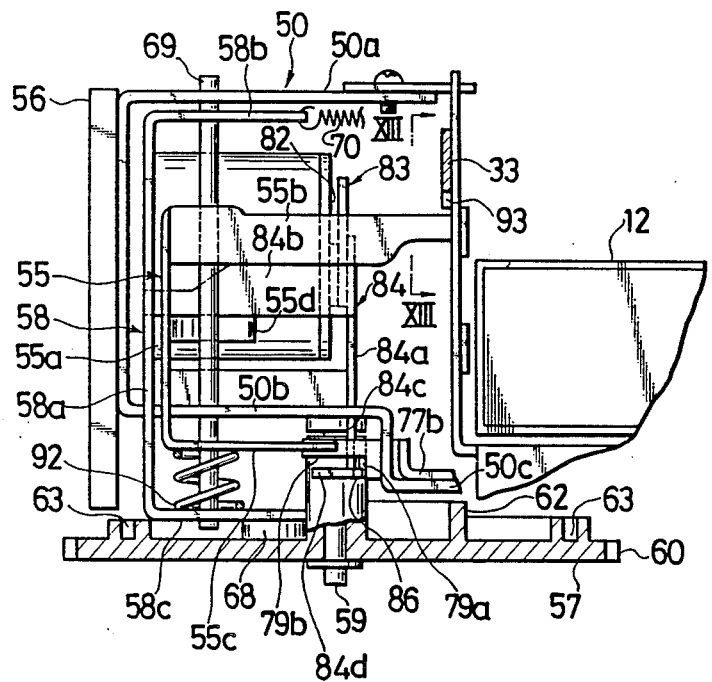
FIG. 12 is a view similar to FIG. 10 but showing the ejecting operating unit in a different operating condition.

Referring to FIGS. 7, 10 and 12, the driving force transmitting member 55 serving as a second pivotal member has a pair of upper and lower horizontal portions 55b and 55c provided contiguously to upper and lower ends of an intermediate vertical portion 55a. A horizontal engaging piece 55d having a curved shape in plan is provided contiguously at a side edge of the intermediate vertical portion 55a of the driving force transmitting member 55. The driving force transmitting member 55 is mounted for coaxial and integral pivotal motion with the first pivotal member 58 and for movement within a predetermined range in a direction of the axis of the shaft 69 relative to the shaft 69 between the upper and lower horizontal walls 58b and 58c of the first pivotal member 58 as shown in FIG. 10. The driving force transmitting member 55 is normally biased upwardly by a compression coil spring 92 interposed between the lower horizontal wall 58c of the first pivotal member 58 and the lower horizontal portion 55c of the driving force transmitting member 55. The lateral arm 84b of the third movable member 84 normally engages with an upper edge of the horizontal engaging piece 55d of the driving force transmitting member 55. If the third pivotal member 84 is pivoted together with the second movable member 83 by energization of the head holding electromagnet 82, the lateral arm 84b thereof pushes down the engaging piece 55d of the driving force transmitting member 55 to pivot the driving force transmitting member 55 downwardly as shown in FIG. 12 against the biasing force of the spring 92.

Figure 11:
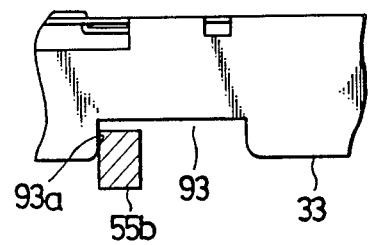
FIG. 11 is an enlarged sectional view taken along line XI—XI of FIG. 10.

When the driving force transmitting member 55 is positioned at its upper pivotal position by the urging force of the spring 92 as shown in FIG. 10, an end of the upper horizontal portion 55b thereof is received in a substantially channel-shaped engaging recess 93 formed at a substantially intermediate portion of a lower edge of the ejecting operating member 33 as shown in FIG. 11 and engages with a side edge 93a of the engaging recess 93 of the ejecting operating member 33 while an end portion of the lower horizontal portion 55c of the driving force transmitting member 55 is positioned out of engagement above the abutting lug 79b of the head panel shifting member 77 as shown in FIG. 10.

Figure 13:
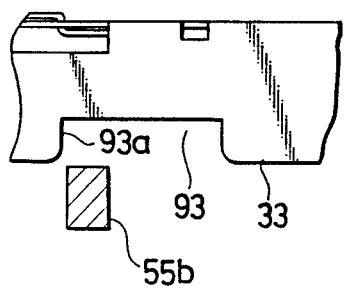
FIG. 13 is an enlarged sectional view taken along line XIII—XIII of FIG. 12.

When the driving force transmitting member 55 is positioned at its lower position as shown in FIG. 12 against the biasing force of the spring 92, the end of the upper horizontal portion 55b thereof is located out of engagement below the engaging recess 93 of the ejecting operating member 33 as shown in FIG. 13 and does not engage with the side edge 93a of the engaging recess 93 while the end portion of the lower horizontal portion 55c of the driving force transmitting member 55 is positioned in level with the abutting lug 79b of the head moving member 77 as shown in FIG. 12 so that, if the driving force transmitting member 55 pivots, the end portion of the lower horizontal portion 55c thereof will be brought into contact with the abutting lug 79b of the head moving member 77 to push the head moving member 77.

Referring to FIGS. 3, 6 and 7, the tape judging switch 115 is mounted on a lower face of the lower base plate 50c of the unit base plate 50. The tape judging switch 115 includes a switch device 115b mounted at a central portion of a mounting plate 115a in the form of a printed circuit board as shown in FIG. 3. The switch device 115b may have the form of a slide switch, and a switch operating element not shown on the top of the slide switch 115b is received in a recess not shown of a slide member 94 which is provided for sliding movement within a predetermined range on a lower face of the lower base plate 50c of the unit base plate 50. The slide member 94 has a bent fitting lug 94a formed thereon for fitting in the tape discriminating hole which is perforated in the casing of a tape cassette for a chrome tape but not perforated in the casing of a tape cassette for a normal tape. The switch operating tab 40 of the operating force transmitting member 37 is engaged with the slide member 94 via a pivotal member 96 which is mounted for pivotal motion within a predetermined range by means of a shaft 95 on the upper face of the lower base plate 50c. The pivotal member 96 has a bent engaging lug 96a and an engaging arm 96b at opposite ends thereof. The engaging lug 96a of the pivotal member 96 extends for movement through a sectoral hole 97 perforated in the lower base plate 50c and is fitted in an engaging hole 94b of the slide member 94 while the engaging arm 96b engages with the switch operating tab 40 of the operating force transmitting member 37. The slide member 94 is normally biased in a direction to move the fitting lug 94a thereof forwardly toward a tape cassette 17 loaded in the operative position by means of a tension coil spring 99.

Figure 5:
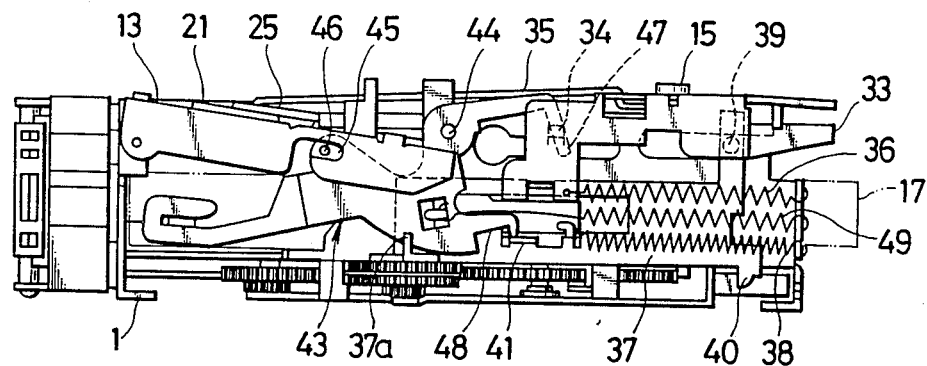
FIG. 5 is an elevational view as viewed in the direction of an arrow mark V in FIG. 4.

When the operating force transmitting member 37 is positioned at its leftmost position as shown in FIG. 2 against the biasing force of the spring 49, the slide member 94 is held by the switch operating tab 40 of the operating force transmitting member 37 via the pivotal member 96 at a position in which the fitting lug 94a of the slide member 94 is retracted far away from a tape cassette 17 in the operative position against the biasing force of the spring 49. In this position, the fitting lug 94a of the slider member 94 does not interfere with insertion or removal of the tape cassette 17 through the cassette inserting and removing opening 16. If the operating force transmitting member 37 is moved from its leftmost position to its rightmost position as shown in FIG. 5 by the biasing force of the spring 49, holding of the slide member 94 by the switch operating lug tab of the operating force transmitting member 37 via the pivotal member 96 against the biasing force of the spring 99 is canceled so that the slide member 94 is allowed to be advanced by the biasing force of the spring 99. In this instance, if the magnetic tape of a tape cassette 17 loaded in the operative position is a normal tape, then the casing of the tape cassette 17 has no tape discriminating hole therein. Accordingly, the fitting lug 94a of the slide member 94 is engaged with a wall of the casing thereby to hinder further advancement of the slider member 94 by the biasing force of the spring 99. The tape judging switch 115 thus assumes a corresponding normal tape operating position for operation of the electric circuit in conformity with a normal tape. To the contrary, if the magnetic tape of the tape cassette 17 is a chrome tape, the fitting lug 94a of the slide member 94 is admitted into the tape discriminating hole of the casing of the tape cassette 17 so that the slide member 94 is moved forwardly. Upon such advancement of the slide member 94, the tape judging switch 115 is switched to the other chrome tape operating position for operation of the electric circuit in accordance with a chrome tape.

Figure 14:
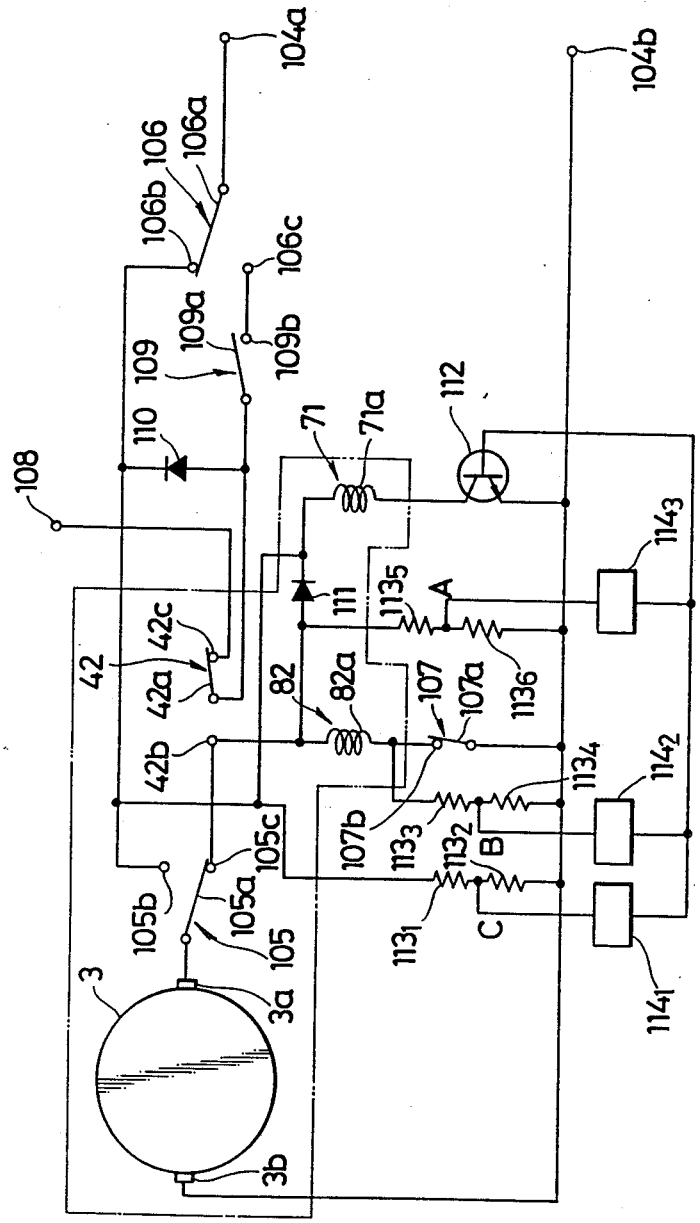
FIGS. 14 to 18 are circuit diagrams showing an electric circuit of the cassette tape recorder in different operating conditions where the cassette tape recorder is incorporated in a main power source switch circuit of a vehicle.

The operation change-over switch 42 shown in FIG. 14 is installed on the printed circuit board 56. The operation change-over switch 42 is provided for causing change-over of operation between the tape recorder of the present invention and a radio set not shown provided in a juxtaposed relationship with the tape recorder. The operation change-over switch 42 may be a slide switch having a movable contact 42a which has an integral slider not shown normally held in engagement with an engaging lug 37a of the operating force transmitting member 37. When the operating force transmitting member 37 is positioned at the leftmost ejecting position together with the ejecting operating member 33 as shown in FIG. 2 against the biasing force of the spring 36, the operation change-over switch 42 assumes a first position in which the radio operates. To the contrary, when the operating force transmitting member 37 is positioned at its rightmost position together with the ejecting operating member 33 as shown in FIG. 5 by the biasing force of the spring 36, the operation change-over switch 42 assumes a second position in which the cassette tape recorder operates.

Referring to FIG. 1, a pair of manually operable tape fast feeding operating members 100 and 101 are disposed in an overlapping relationship at a location above the magnetic head 19 and mounted for sliding movement in the left and rightward directions on the main base plate 1. The tape fast feeding operating members 100 and 101 are normally biased rightwardly by tension coil springs 102 and 103, respectively. If the tape fast feeding operating member 100 is moved to its leftmost position, then the turning force of the tape feeding drive motor 3 is transmitted to rotate the right reel shaft 4a at a high speed, but if the other tape fast feeding operating member 101 is moved to its leftmost position, then the turning force of the tape feeding drive motor 3 is transmitted to rotate the left reel shaft 4b at a high speed. On the other hand, if both of the tape fast feeding operating members 100 and 101 are moved simultaneously to their leftmost positions, then the tape feeding direction is reversed by manual operation irrespective of operation of an automatic reversing mechanism not shown for automatically reversing the feeding direction of a tape at an end of the tape.

Operational interrelation among the tape feeding drive motor 3, operation change-over switch 42, trigger canceling electromagnet 71, head holding electromagnet 82, tape judging switch 115 and their associated mechanisms will now be described with reference to FIG. 14 showing a main power source switch circuit or key switch circuit of a vehicle in which the tape recorder of the present invention is incorporated. In FIG. 14, the circuit is shown when a tape cassette is not loaded in position in the tape recorder. The tape feeding drive motor 3 has a pair of terminals 3a and 3b, and the terminal 3a may be connected to a terminal 104a of a power source not shown via a series circuit including a movable contact 105a and a first fixed contact 105b of a motor power source change-over switch 105 and a first fixed contact 106b and a movable contact 106a of a key switch 106. The motor power source change-over switch 105 is switched when the driving gear 57 is rotated as a result of energization of the trigger canceling electromagnet 71. The other terminal 3b of the tape feeding drive motor 3 is directly connected to the other terminal 104b of the power source. A second fixed contact 105c of the motor power source change-over switch 105 is connected to a terminal of a coil 82a of the head holding electromagnet 82 via a first fixed contact 42b of the operation change-over switch 42 which has a second fixed contact 42c connected to a terminal 108 of the radio set not shown. The operation change-over switch 42 is thus provided for causing change-over of operation between the tape recorder and the radio set. An ejecting operating switch 107 serving as an ejection initiating means is interposed in series between the other terminal of the coil 82a of the head holding electromagnet 82 and the other terminal 104b of the power source. A power source switch 109 which may otherwise be a pause switch for both of the cassette tape recorder and the radio set and serves as a stopping signaling means is interposed in series between a movable contact 42a of the operation change-over switch 42 and a second fixed contact 106c of the key switch 106. A first diode 110 is interposed in series between the first fixed contact 106b of the key switch 106 and a movable contact 109a of the power source switch 109. A fixed contact 109b of the power source switch 109 is connected to the fixed contact 106c of the key switch 106. The terminal of the coil 82a of the head holding electromagnet 82 connected to the first fixed contact 42b of the operation change-over switch 42 is connected to one of a pair of terminals of a coil 71a of the trigger canceling electromagnet 71. The other terminal of the coil 71a of the trigger canceling electromagnet 71 is connected to the collector terminal of a transistor 112. The emitter terminal of the transistor 112 is connected to a junction between the other terminal 3b of the tape feeding drive motor 3 and the other terminal 104b of the power source. A junction between the first fixed contact 105b of the motor power source change-over switch 105 and the first diode 110 is connected via a series circuit of first and second resistors $113_1$ and $113_2$ to a junction between the other terminal 3b of the tape feeding drive motor 3 and the emitter terminal of the transistor 113. A junction between the first fixed contact 105b of the motor power source change-over switch 105 and the first resistor $113_1$ is connected to a junction between a second diode 111 and the one terminal of the coil 71a of the trigger canceling electromagnet 71. A junction between the other terminal of the coil 82a of the head holding electromagnet 82 and a fixed contact 107b of the ejecting operating switch 107 is connected via a series circuit of third and fourth resistors $113_3$ and $113_4$ to a junction between the second resistor $113_2$ and a movable contact 107a of the ejecting operating switch 107. A junction between the coil 82a of the head holding electromagnet 82 and the second diode 111 is connected via a series circuit of fifth and sixth resistors $113_5$ and $113_6$ to a junction between the movable contact 107a of the ejecting operating switch 107 and the emitter terminal of the transistor 112. A junction between the first and second resistors $113_1$ and $113_2$, another junction between the third and fourth resistors $113_3$ and $113_4$ and a further junction between the fifth and sixth resistors $113_5$ and $113_6$ are connected via monostable multivibrators $114_1$, $114_2$ and $114_3$, respectively, commonly to the base terminal of the transistor 112. Each of the monostable multivibrators $114_1$ to $114_3$ thus causes the trigger canceling electromagnet 71 to be energized for a predetermined period of time when it receives a signal of a high voltage level at its input terminal connected to a junction between the resistors $113_1$ and $113_2$, $113_3$ and $113_4$ or $113_5$ and $113_6$ which constitute a voltage dividing circuit C, B or A, respectively.

Operation of the cassette tape recorder of the present invention will now be described with reference to the circuit diagrams of FIGS. 14 to 18 and the flow chart of FIG. 19. In the stopping or rest condition of the tape recorder as shown in FIGS. 1, 2 and 14, the slider 23 stays at its initial rightmost position in FIGS. 1 and 2 under the biasing force of the spring 25; the cassette holder 12 is at its cassette unloading position spaced upwardly away from the main base plate 1, and the arresting portion 30 of the arresting member 28 is arrested by the upper edge of the side wall 1c of the main base plate 1 to prevent movement of the cassette holder 12 toward the cassette operating position; under the biasing force of the spring 36 transmitted via the connecting link 35 and the ejecting operating member 33, the spring receiving member 21 is at its home position in which the spring force is accumulated in the spring 25; the returning movement of the operating force transmitting member 37 in the rightward direction in FIGS. 1 and 2 by the spring 38 is inhibited due to engagement of the engaging bent lug 41 of the operating force transmitting member 37 in the recess 48 of the interlocking member 43; the operating force transmitting member 37 in this position holds the slide member 94 at its retracted position via the pivotal member 96 against the biasing force of the spring 99; and the operation change-over switch 42 is held at its first position in which the movable contact 42a thereof contacts with the second fixed contact 42c so that the radio set may operate.

Further, pivotal motion by the biasing force of the springs 38 and 49 of the interlocking member 43 in the counterclockwise direction in FIGS. 1 and 2 to move the cassette holder 12 to its cassette operating position is inhibited by engagement between the elongated hole 45 in the pivotal plate 13 of the cassette holder 12 and the engaging pin 46 on the interlocking member 43; the movable contact 105a of the motor power source change-over switch 105 is held in contact with the second fixed contact 105c; and the key switch 106 is in its off state without an engine key fitted in the key hole, and accordingly the movable contact 106a thereof is held in contact with the first fixed contact 106b.

In addition, the electromagnets 71 and 82 are in their off state and the arresting pin 76 is arrested by the arresting shoulder 64 of the cam groove 63 of the driving gear 57 as shown in solid lines in FIG. 8 so that the driving gear 57 is held from rotation in its inoperative position in which the driving gear 57 does not mesh with the rotation transmitting gear 10 with the recessed portion 61 thereof held in an opposing relationship to the rotation transmitting gear 10.

Figure 15:
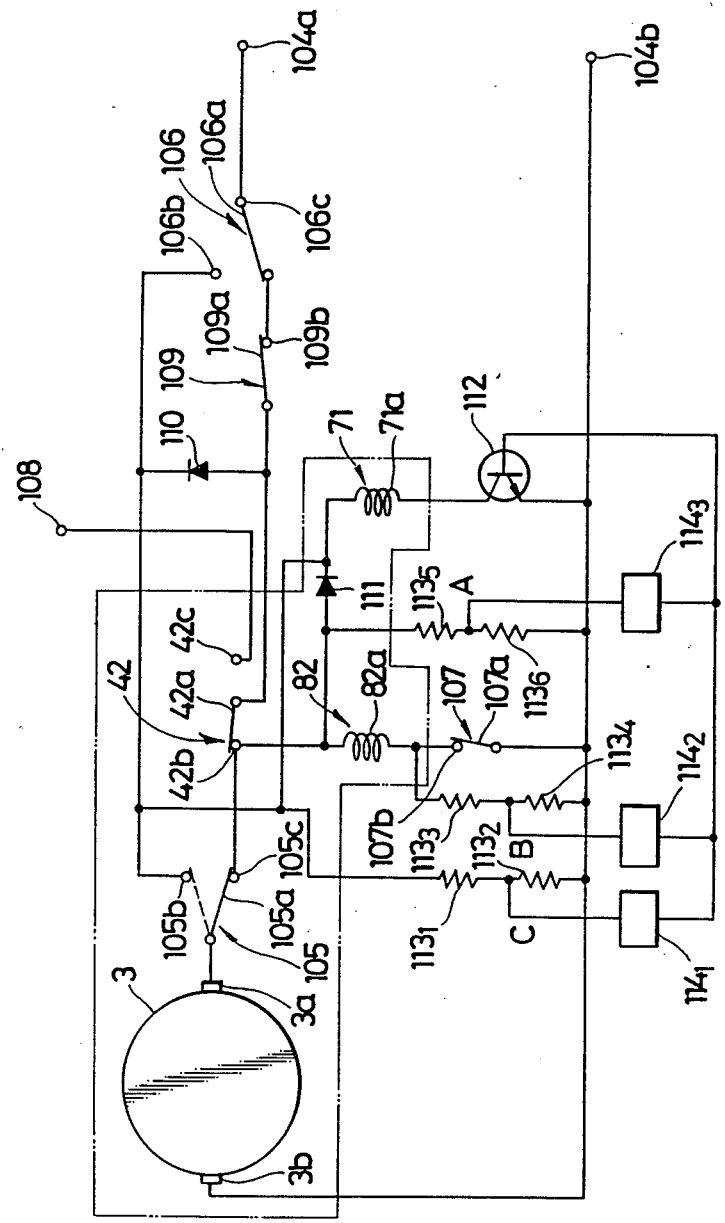

The engine key will be inserted into the key hole and turned in this condition if it is intended to start operation of the tape recorder or the radio set or start the vehicle. Upon such turning motion of the engine key, the movable contact 106a of the key switch 106 is brought into contact with the second fixed contact 106c, and at the same time the power source switch 109 for the cassette tape recorder and the radio set is turned on. Then, if a tape cassette 17 is inserted substantially in parallel to the main base plate 1 in the longitudinal direction into the cassette holder 12 through the cassette inserting and removing opening 16, the slider 23 located on the insertion line of the tape cassette 17 is moved forward against the biasing force of the spring 25. During the forward movement of the slider 23, the degree of elastic deformation of the spring 25 increases gradually, and when the slider 23 moves farther than a position at which the spring 25 presents its maximum degree of elastic deformation, the biasing force of the spring 18 now acts to move the slider 23 in the forward direction. Consequently, the tape cassette 17 is drawn into the cassette holder 12 by the elastic force of the spring 18 irrespective of the force to push in the tape cassette 17 until the slider 23 is abutted with the abutting tab 29 of the arresting member 28 to pivot the arresting member 28 against the biasing force of the spring 31. As a result of such pivotal motion of the arresting member 28, the arresting portion 30 of the arresting member 28 is disengaged from the upper edge of the side wall 1c of the main base plate 1 as seen in FIG. 4. Consequently, the pivotal plate 13 of the cassette holder 12 is pivoted in the clockwise direction in FIG. 2 by the biasing force of the springs 38 and 49 while the interlocking member 43 is pivoted in the counterclockwise direction in FIG. 2 by the biasing force of the springs 38 and 49. Upon such clockwise pivotal motion of the pivotal plate 13, the cassette inserting member 14 is lowered to the cassette operating position in which the tape cassette 17 is received on the reel shafts 4a and 4b and the capstan shafts 5a and 5b as seen in FIGS. 4 and 5. Meanwhile, upon the counterclockwise pivotal motion of the interlocking member 43, the engaging bent lug 41 of the operating force transmitting member 37 is retracted from the recess 48 of the interlocking member 43 to allow the operating force transmitting member 37 to be moved in the rightward direction in FIG. 2 by the biasing force of the spring 49. As the operating force transmitting member 37 moves in the rightward direction, holding of the slide member 94 at its retracted position against the biasing force of the spring 99 is canceled while the operation change-over switch 42 is switched to the second position in which the movable contact 42a thereof contacts with the first fixed contact 42b as shown in FIG. 15 to cause the tape recorder to operate. In case the magnetic tape in the tape cassette 17 loaded in the operative position is a chrome tape, the fitting lug 94a of the slide member 94 is admitted into the tape discriminating hole not shown perforated in the casing of the tape cassette 17 whereupon the slide member 94 is advanced by the biasing force of the spring 99 thereby to switch the tape discriminating switch 115 to the chrome tape operating position. To the contrary, in case the magnetic tape in the tape cassette 17 is a normal tape, such advancement of the slide member 94 as described just above is prevented due to absence of such a tape discriminating hole as in the casing of the tape cassette 17 for a chrome tape and accordingly the tape discriminating switch 115 assumes its normal tape operating position. As the operation change-over switch 42 is switched to the tape recorder operating position, the head holding electromagnet 82 and the tape feeding drive motor 3 are energized while the voltage dividing circuit A is excited to render the monostable multivibrator circuit 114₃ operative. The monostable multivibrator circuit 114₃ thus develops a single pulse signal in response to which the trigger canceling electromagnet 71 is instantaneously turned on and then turned off immediately. It is to be noted that the head holding electromagnet 82 is kept energized while the tape cassette 17 is held in the operative position.

When the head holding electromagnet 82 is energized, the second movable member 83 is attracted to the head holding electromagnet 82 to pivot the third movable member 84 in the counterclockwise direction in FIG. 10 whereupon the driving force transmitting member 55 is pushed down to the position shown in FIG. 12 against the biasing force of the spring 92. Upon the downward movement of the driving force transmitting member 55, the lower horizontal portion 55c thereof comes to a position in which it is in level with the abutting lug 79b of the head panel shifting member 77 so that the end portion thereof can engage with the latter when the driving force transmitting member 55 pivots while the end of the upper horizontal portion 55b of the driving force transmitting member 55 moves down away from the the engaging recess 93 of the ejecting operating member 33 and out of engagement with the side edge 93a of the engaging recess 93 as shown in FIG. 13.

When the trigger canceling electromagnet 71 is temporarily energized, the first movable member 72 is attracted thereto to pivot to a position indicated in two dot chain lines in FIG. 8 against the biasing force of the spring 75 whereupon the arresting pin 76 is disengaged from the arresting shoulder 64 of the cam groove 63. Consequently, the driving gear 57 is pivoted by a predetermined angle in the direction indicated by the arrow mark in FIG. 8 by the biasing force of the spring 66 until the toothed portion 60 thereof is meshed with the rotation transmitting gear 10. As a result, the turning force of the tape feeding drive motor 3 is transmitted to the driving gear 57 via the rotation transmitting mechanism 7 and the rotation transmitting gear 10 so that the driving gear 57 is rotated in the direction of the arrow mark in FIG. 8 by about one full rotation except for an angle of a range over which the recessed portion 61 is formed. Such rotation of the driving gear 57 is stopped when the arresting pin 76 is finally arrested by the arresting shoulder 64 of the cam groove 63 again. During the rotation of the driving gear 57, the movable contact 105a of the motor power source change-over switch 105 is held in contact with the first fixed contact 105b, and after substantially one full rotation of the driving gear 57, the movable contact 105a is brought into contact with the second fixed contact 105b again. As the driving gear 57 rotates, the first pivotal member 58 is pivoted in the counterclockwise direction in FIG. 6 against the biasing force of the spring 70 due to sliding contact between the spiral cam 62 of the driving gear 57 and the cam roller 68 of the first movable member 58. Upon pivotal motion of the first pivotal member 58, the driving force transmitting member 55 is pivoted in an integral relationship with the same, and as the driving force transmitting member 55 is pivoted, the end of the lower horizontal portion 55c of the driving force transmitting member 55 presses against the abutting lug 79b of the head panel shifting member 77 so that the head panel shifting member 77 is pivoted in the counterclockwise direction in FIG. 3. As the head panel shifting member 77 is pivoted, the head panel 18 connected thereto is moved downwardly in FIG. 1 against the biasing force of the spring 20 whereupon the magnetic head 19 and the pinch rollers 6a and 6b are shifted to their respective operative positions wherein the magnetic head 19 contacts with the magnetic tape not shown in the tape cassette 17 and one of the capstan shafts 5a and 5b, for example, the capstan shaft 5b which is currently being rotated by the tape feeding drive motor 3 is contacted by the corresponding pinch roller 6b. It is to be noted that, while the first pivotal member 58 is pivoted back to its initial position together with the driving force transmitting member 55 by the biasing force of the spring 70 after about one full rotation of the driving gear 57, the magnetic head 19 and the pinch rollers 6a and 6b are held at their respective operative positions until the head holding electromagnet 82 is deenergized due to engagement, as shown in FIG. 9, of the engaging projection 86 of the third movable member 84 with the engaging lug 79a of the head panel shifting member 77 which is in its limit position of pivotal motion in the clockwise direction in FIG. 6. Further, by rotation of the tape feeding drive motor 3, either one of the reel shafts 4a and 4b is rotated via the reel shaft side section 7a of the rotation transmitting mechanism 7 while both of the capstan shafts 5a and 5b are rotated in the respective tape winding directions via the capstan shaft side section 7b of the rotation transmitting mechanism 7 to feed the magnetic tape forwardly to effect reproducing operation. When the magnetic tape is wound up to its last end, the automatic reversing mechanism not shown operates so that the tape feeding direction is reversed and reproducing operation is continued.

Figure 16:
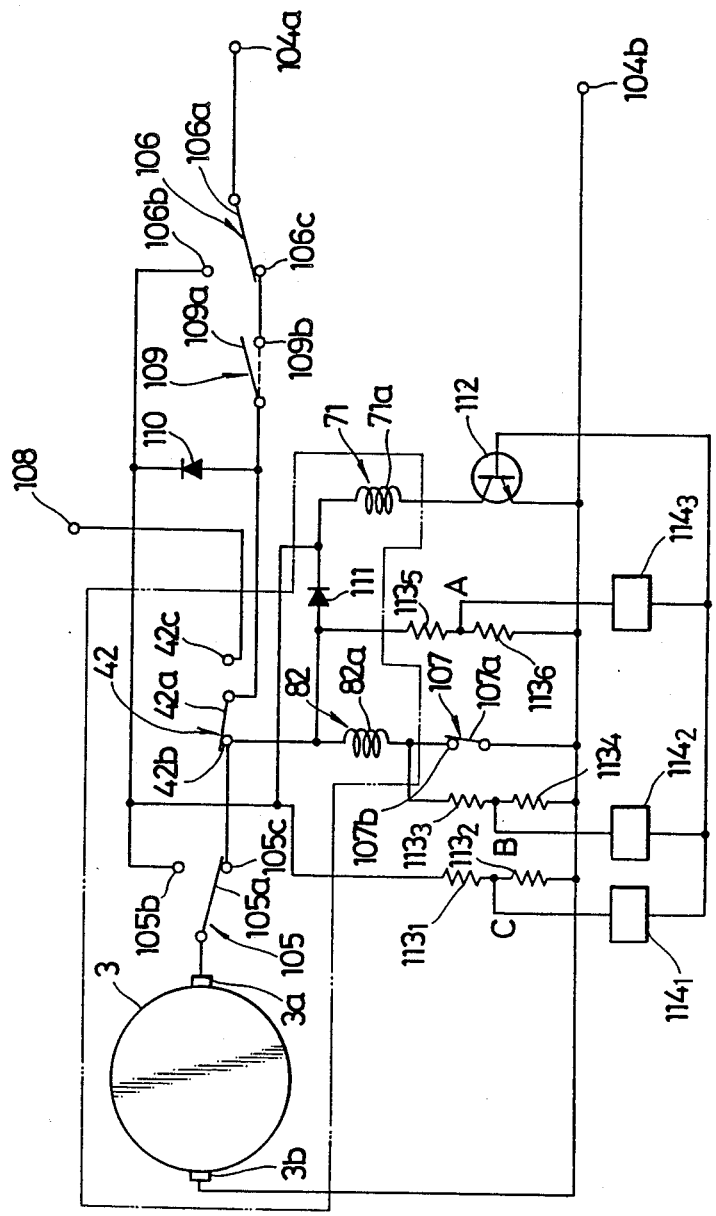

Then, if only the power source switch 109 for the cassette tape recorder and the radio set or else the pause switch not shown is turned off as seen in FIG. 16 in order to effect a stopping or pause operation of the tape recorder which involves shifting movement of the magnetic head 19 and the pinch rollers 6a and 6b away from the tape cassette 17 with the tape cassette 17 kept loaded in the operative position when the tape recorder is in the above-described reproducing condition as shown in FIGS. 4, 5 and 15, the entire circuit is deenergized. As a result of deenergization of the head holding electromagnet 82, the second movable member 83 is moved away from the electromagnet 82 and the third movable member 84 is pivoted in the clockwise direction in FIG. 12 by the biasing force of the spring 92 via the driving force transmitting member 55 so that the engaging projection 86 thereof is disengaged from the engaging lug 79a of the head panel shifting member 77. Consequently, the head panel 18 is moved upwardly in FIG. 4 by the biasing force of the spring 20 whereupon the magnetic head 19 and the pinch rollers 6a and 6b are shifted back to the respective inoperative positions.

When the third movable member 84 is pivoted in the clockwise direction, the driving force transmitting member 55 is moved upwardly in FIG. 12 by the biasing force of the spring 92 to a position as shown in FIG. 10 wherein the end of the lower horizontal portion 55c thereof is positioned above and out of engagement with the abutting lug 79b of the head panel shifting member 77 while the end of the upper horizontal portion 55b thereof is positioned in the engaging recess 93 of the ejecting operating member 33 and engages with the side edge 93a of the engaging recess 93 as shown in FIG. 11.

It is to be noted that if the power source switch 109 for the cassette tape recorder and the radio set is turned on in the rest condition of the circuit shown in FIG. 16, the tape recorder operates in a similar manner to that of the case described with reference to FIG. 15 above.

Figure 17:
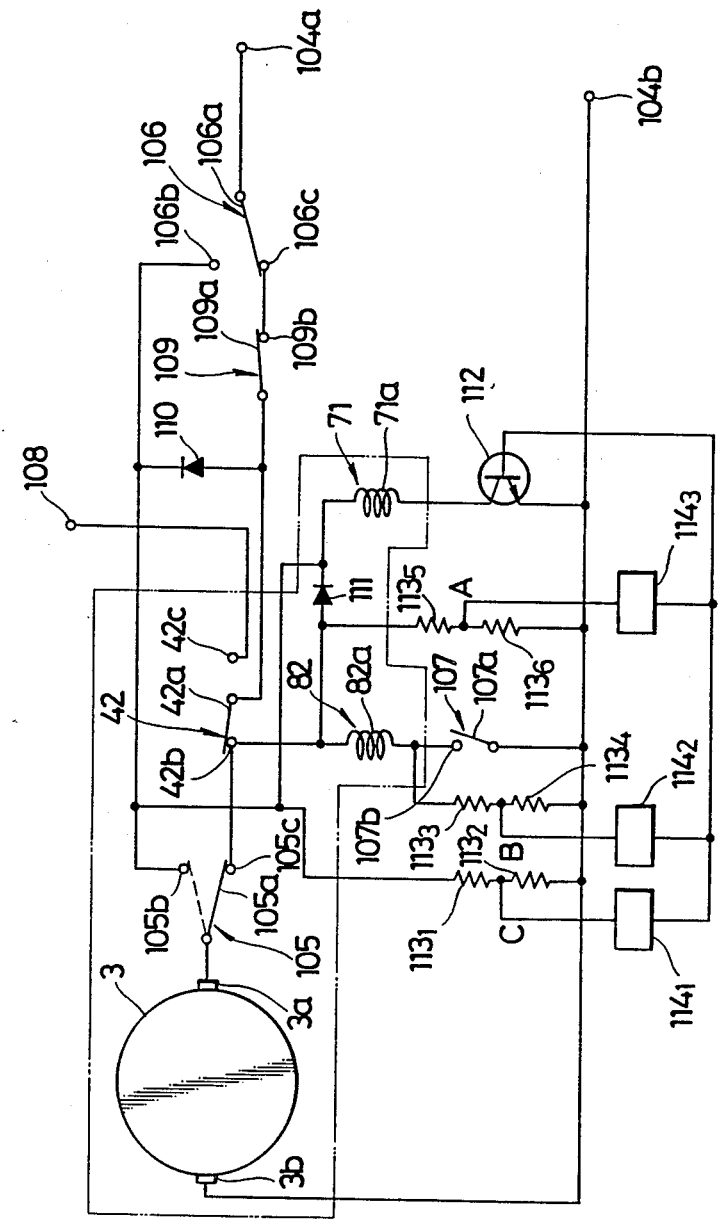

In order to remove the tape cassette 17 when the tape recorder is in the reproducing condition as shown in FIGS. 4, 5 and 15, the ejecting operating switch 107 will be manually turned off as shown in FIG. 17. As the ejecting operating switch 107 is turned off, the voltage dividing circuit B is excited to cause a voltage drop across the head holding electromagnet 82, thereby de-energizing the head holding electromagnet 82. Consequently, similarly as in the case of the stopping operation described above, the head panel 18 is moved in the upward direction in FIG. 4 by the biasing force of the spring 20 to shift the magnetic head 19 and the pinch rollers 6a and 6b to their respective inoperative positions, and the driving force transmitting member 55 is moved to the position in which the end of the lower horizontal portion 55c thereof is positioned above and out of engagement with the abutting lug 79b of the head panel shifting member 77 and the end of the upper horizontal portion 55b thereof is positioned in the engaging recess 93 of the ejecting operating member 33 and engages with the side edge 93a of the engaging recess 93 as shown in FIG. 11. As the voltage dividing circuit B is excited, the monostable multivibrator circuit $114_2$ is rendered operative, and the transistor 112 receives a single pulse signal developed from the circuit $114_2$ and is rendered conducting so that the trigger canceling electromagnet 71 is instantaneously turned on and then immediately turned off. As the trigger canceling electromagnet 71 is temporarily turned on, the toothed portion 60 of the driving gear 57 is meshed with the rotation transmitting gear 10 in a similar manner as in the reproducing operation as described above so that the turning force of the tape feeding drive motor 3 is transmitted to the driving gear 57 via the rotation transmitting mechanism 7 and the rotation transmitting gear 10. Consequently, the driving gear 57 is rotated by about one full rotation except the angular range of the recessed portion 61 thereof until the arresting pin 76 is arrested by the arresting shoulder 64 of the cam groove 63 again. During the rotation of the driving gear 57, the movable contact 105a of the motor power source change-over switch 105 is held in contact with the first fixed contact 105b, and after about one full rotation of the driving gear 57, the movable contact 105a is brought into contact with the second fixed contact 105c. As the driving gear 57 rotates, the driving force transmitting member 55 is pivoted in the counterclockwise direction in FIG. 6 together with the first pivotal member 58 against the biasing force of the spring 70 in a similar manner as in the reproducing operation as described hereinabove. Consequently, the end of the upper horizontal portion 55b of the driving force transmitting member 55 pushes the ejecting operating member 33 to move in the leftward direction in FIG. 5 against the biasing force of the spring 36. As the ejecting operating member 33 moves in the leftward direction, the engaging bent lug 41 of the operating force transmitting member 37 is engaged with and presses against a side edge of the recess 48 of the interlocking member 43 to pivot the interlocking member 43 in the clockwise direction in FIG. 5. Consequently, the pivotal plate 13 is pivoted in the counterclockwise direction, and following this, the cassette inserting member 14 moves up to the cassette unloading position whereupon the tape cassette 17 is moved up away from the reel shafts 4a and 4b and the capstan shafts 5a and 5b. In this manner, the tape cassette 17 is ejected by such an ejecting mechanism as described above which is denoted at 116 in FIG. 19. As the operating force transmitting member 37 is moved in the leftward direction by the ejecting operating member 33, the switch operating tab 40 thereof moves the slide member 94 against the biasing force of the spring 99 and thereafter holds it at the retracted position. Following this, the tape judging switch 115 is switched to the normal tape operating position if it has been in the chrome tape operating position till then.

Upon leftward movement of the operating force transmitting member 37 in FIG. 5, also the operation change-over switch 42 is switched to the first position wherein the movable contact 42a thereof is held in contact with the second fixed contact 42c so that the radio set is operating. As the ejecting operating member 33 is moved leftwardly, the spring receiving member 21 is pivoted in the forward or counterclockwise direction in FIG. 4 via the interlocking link 35 whereupon the spring 25 is turned over. Consequently, the slider 23 is moved rightwardly in FIG. 4 by the biasing force of the spring 25 to move the tape cassette 17 in the rightward removing direction in FIG. 4. At the same time, the arresting member 28 is pivoted back in the clockwise direction in FIG. 4 by the biasing force of the spring 31 until the arresting portion 30 thereof is arrested by the upper edge of the side wall 1c of the main base plate 1.

Figure 18:
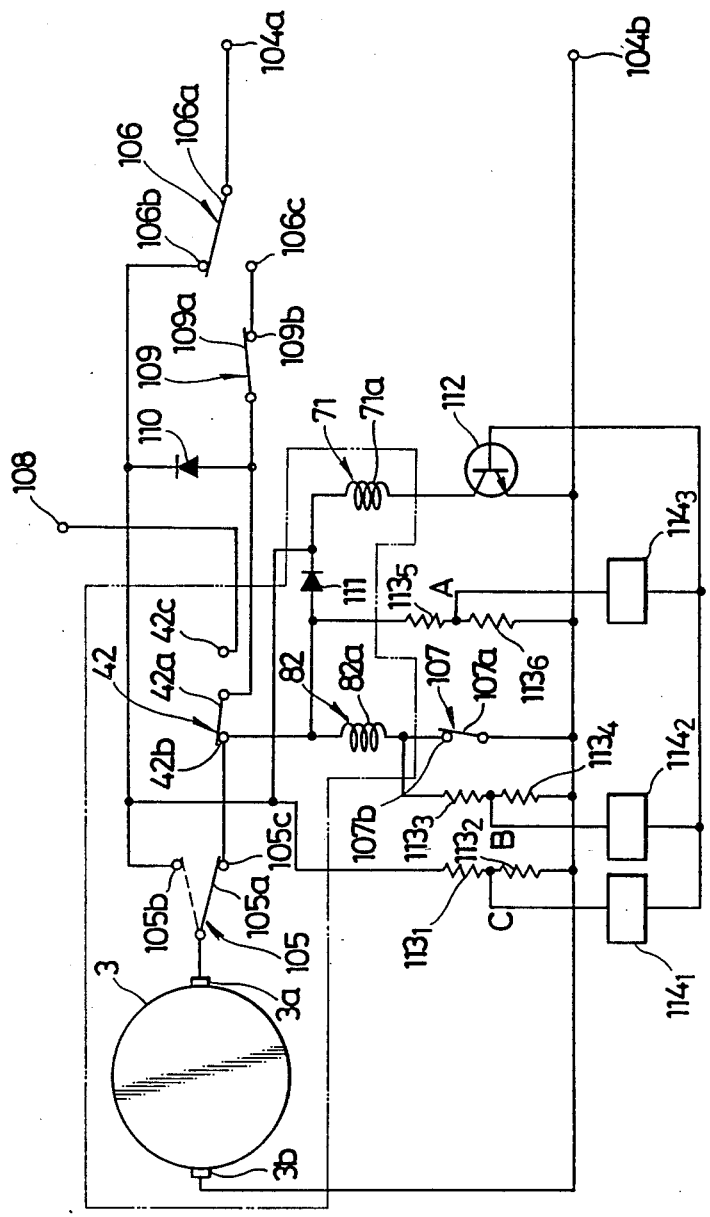
Figure 19:
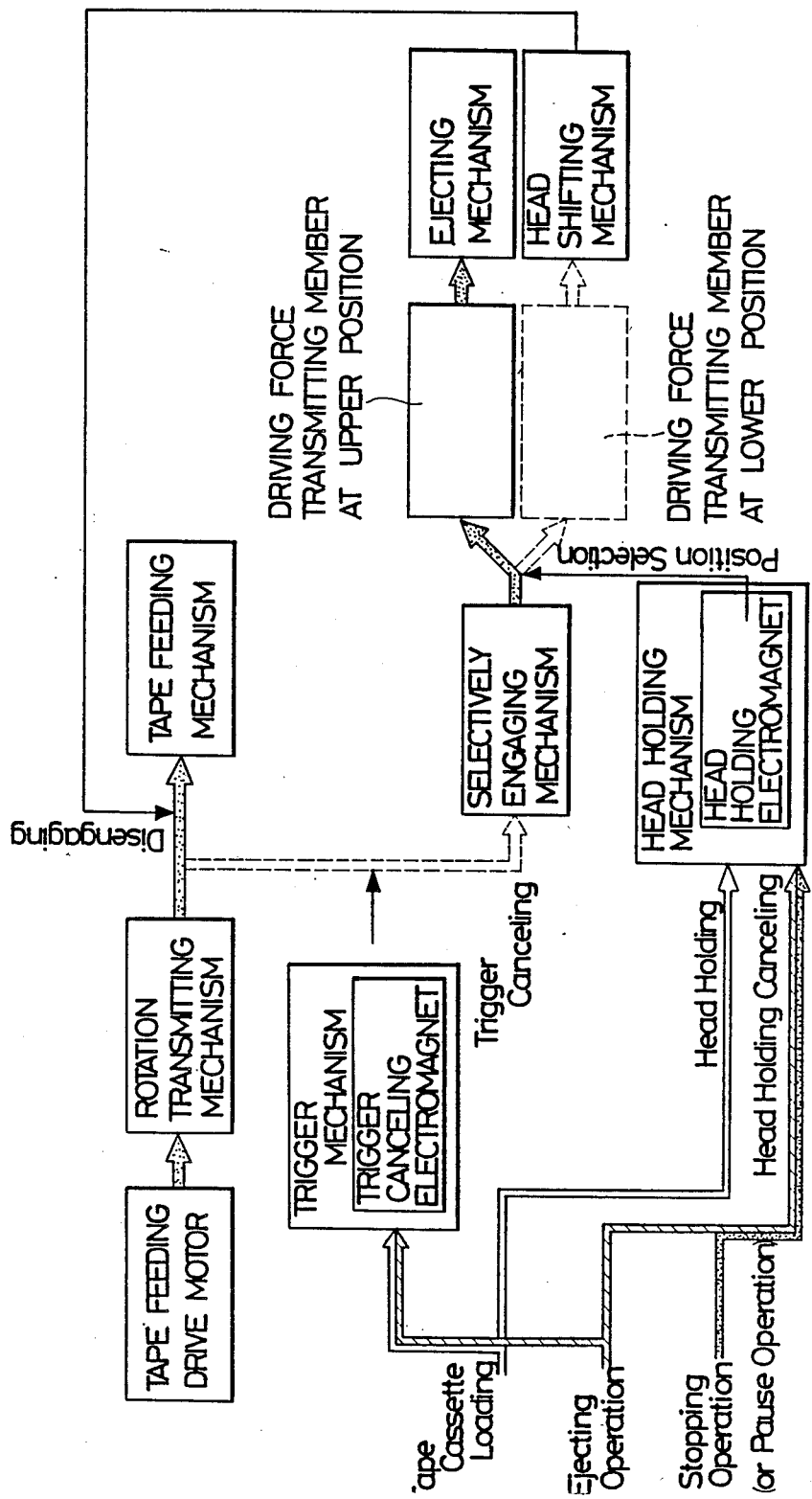
FIG. 19 is a flow chart illustrating operation of the tape recorder mechanism.

If the engine key is pulled off from the key hole to turn the key switch 106 to the off state as shown in FIG. 18 wherein the movable contact 106a thereof contacts with the first fixed contact 106b when the tape recorder is in the operative condition shown in FIGS. 4, 5 and 15, the head holding electromagnet 82 is deenergized while the voltage dividing circuit C is excited. In response to such excitation of the voltage dividing circuit C, the monostable multivibrator circuit $114_1$ is rendered operative to develop a single pulse signal, and in response to the pulse signal, the transistor 112 is rendered conducting so that the trigger canceling electromagnet 71 is instantaneously turned on and then turned off immediately. As the trigger canceling electromagnet 71 is temporarily turned on, the toothed portion 60 of the driving gear 57 is meshed with the rotation transmitting gear 10 in a similar manner as in the reproducing operation as described hereinabove so that the turning force of the tape feeding drive motor 3 is transmitted to the driving gear 57 via the rotation transmitting mechanism 7 and the rotation transmitting gear 10. Consequently, the driving gear 57 is rotated by about one full rotation except for the angular range of the recessed portion 61 thereof until the arresting pin 76 is arrested by the arresting shoulder 64 of the cam groove 63 again. During rotation of the driving gear 57, the movable contact 105a of the motor power source change-over switch 105 is held in contact with the first fixed contact 105b, and after the driving gear 57 is rotated by about one full rotation, the movable contact 105a thereof is contacted with the second fixed contact 105c again. As the driving gear 57 rotates, the driving force transmitting member 55 is pivoted in the counterclockwise direction in FIG. 6 together with the first pivotal member 58 against the biasing force of the spring 70 in a similar manner as in the reproducing operation described hereinabove. Consequently, the end of the upper horizontal portion 55b of the driving force transmitting member 55 pushes the ejecting operating member 33 to move in the leftward direction in FIG. 5 against the biasing force of the spring 36. As the ejecting operating member 33 moves in the leftward direction, the engaging bent lug 41 of the operating force transmitting member 37 presses against the one side edge of the recess 48 of the interlocking member 43 to pivot the interlocking member 43 in the clockwise direction in FIG. 5. Consequently, the pivotal plate 13 is pivoted in the counterclockwise direction, and following this, the cassette inserting member 14 moves up to the cassette removing position whereupon the tape cassette 17 is removed upwardly from the reel shafts 4a and 4b and the capstan shafts 5a and 5b. Upon leftward movement of the operating force transmitting member 37, the switch operating tab 40 thereof moves the slide member 94 to the retracted position via the pivotal member 96 against the biasing force of the spring 99 and thereafter holds it at the retracted position. Following this, the tape judging switch 115 is switched to the normal tape operating position if it has been in the chrome tape operating position so far.

Upon leftward movement of the operating force transmitting member 37, also the operation change-over switch 42 is switched to the first position wherein the movable contact 42a is held in contact with the second fixed contact 42c so that the radio set is operate. As the ejecting operating member 33 moves leftwardly, the spring receiving member 21 is pivoted in the forward or counterclockwise direction in FIG. 4 via the interconnecting link 35 whereupon the spring 25 is turned over. Consequently, the slider 23 is moved rightwardly in FIG. 4 by the biasing force of the spring 25 to move the tape cassette 17 in the removing or rightward direction in FIG. 4. At the same time, the arresting member 28 is pivoted back in the clockwise direction in FIG. 4 by the biasing force of the spring 31 until the arresting portion 30 thereof is arrested by the upper edge of the side wall 1c of the main base plate 1. As the head holding electromagnet 82 is deenergized, the magnetic head 19 and the pinch rollers 6a are 6b are shifted to their respective inoperative positions in a similar manner as in the stopping operation described hereinabove.

What is claimed is:

1. A cassette tape recorder, comprising a tape feeding mechanism, a tape feeding drive motor, a rotation transmitting mechanism for transmitting the turning force of said tape feeding drive motor to said tape feeding mechanism, an ejecting mechanism for moving a tape cassette from an operative position to an unloading position, a selectively engaging mechanism for selectively engaging with said rotation transmitting mechanism so as to be driven by the turning force of said tape feeding drive motor, a driving force transmitting member for transmitting the operating force of said selectively engaging mechanism to said ejecting mechanism, a trigger mechanism for operating said selectively engaging mechanism to engage with said rotation transmitting mechanism, a head shifting mechanism for shifting a magnetic head and pinch roller from respective inoperative to operative positions, a head holding mechanism including a head holding electromagnet for holding said magnetic head and said pinch roller at the respective operative positions, said driving force transmitting member being alternatively movable between a first position in which it engages with said ejecting mechanism and a second position in which it engages with said head shifting mechanism, means for receiving a tape cassette and for moving the received tape cassette from the unloading to the operative position, said head holding mechanism and said trigger mechanism being rendered operative in response to loading of a tape cassette to the operative positions so that said driving force transmitting member is moved to the second position by said head holding mechanism and said selectively engaging mechanism is engaged with said rotation transmitting mechanism by said trigger mechanism thereby to operate said head shifting mechanism to move said magnetic head and said pinch roller to the respective operative positions at which said magnetic head and said pinch roller are thereafter held by said head holding mechanism, an ejection initiating means for rendering said head holding electromagnet inoperative to cancel holding of said head shifting mechanism by said head holding mechanism and to move said driving force transmitting member to the first position and for simultaneously rendering said trigger mechanism operative to engage said selectively engaging mechanism with said rotation transmitting mechanism, and a stopping signaling means for rendering said head holding electromagnet inoperative to cancel holding of said head shifting mechanism by said head holding mechanism.

2. A cassette tape recorder as claimed in claim 1, wherein said trigger mechanism includes a trigger canceling electromagnet which is temporarily energized in response to loading of a tape cassette to the operative position or to unloading of a tape cassette from the operative position.

3. A cassette tape recorder as claimed in claim 1, wherein said tape feeding mechanism is disconnected from said rotation transmitting mechanism in response to shifting movement of said magnetic head and said pinch roller to the respective inoperative positions.

4. A cassette tape recorder as claimed in claim 1, wherein said ejection initiating means includes a manually operable ejecting operating switch connected in series to said head holding electromagnet.

5. A cassette tape recorder as claimed in claim 1, wherein said stopping signaling means includes a switch connected in series to said tape feeding drive motor.

6. A cassette tape recorder as claimed in claim 1, wherein said driving force transmitting member has a first portion which is engageable with said ejecting mechanism when said driving force transmitting member is in the first position, a second portion which is engageable with said head shifting mechanism when said driving force transmitting member is in the second position, and a third portion which is engaged, when said head holding electromagnet is rendered operative, by said head holding mechanism to move said driving force transmitting member from the first to the second position.

7. A cassette tape recorder as claimed in claim 6, wherein said head holding mechanism further includes a pivotal member supported for pivotal motion between first and second positions around a fixed axis, and said driving force transmitting member is normally urged from the second toward the first position by a spring, said pivotal member being pivoted from the second to the first position by the biasing force of said spring via said driving force transmitting member when said head holding electromagnet is rendered inoperative.

8. A cassette tape recorder as claimed in claim 1, wherein said head holding mechanism further includes a pivotal member supported for pivotal motion between first and second positions around a fixed axis and having a first portion thereon, and when said head holding electromagnet is energized, said pivotal member is pivoted from the first to the second position whereupon said first portion thereof is engaged with and moves said driving force transmitting member from the first to the second position.

9. A cassette tape recorder as claimed in claim 8, wherein said head shifting mechanism includes a shiftable member having first and second positions corresponding to the inoperative to the operative positions of said magnetic head and said pinch roller, and said pivotal member of said head holding mechanism further has a second portion which is engaged, when said shiftable member is shifted from the first to the second position, with a first portion of said shiftable member to thereafter hold said shiftable member at the second position until said head holding electromagnet is rendered inoperative.

10. A cassette tape recorder as claimed in claim 9, wherein said shiftable member has, adjacent said second portion thereof, a second portion which is engaged, when said driving force transmitting member in the second position is driven by said selectively engaging mechanism, by said driving force transmitting member to move said shiftable member from the first to the second position.

11. A cassette tape recorder as claimed in claim 1, wherein said selectively engaging mechanism includes a selectively engaging member having an arresting portion thereon, and a spring for biasing said selectively engaging member into engagement with said rotation transmitting mechanism, and said trigger mechanism includes an electromagnet and an arresting member which normally engages with said arresting portion of said selectively engaging member to hold said selectively engaging member out of engagement with said rotation transmitting mechanism but is moved, when said electromagnet of said trigger mechanism is energized, out of engagement with said arresting portion to allow said selectively engaging member to be brought into engagement with said rotation transmitting mechanism by the biasing force of said spring.

12. A cassette tape recorder as claimed in claim 11, wherein said selectively engaging member is a cyclically operable member which disengages itself from said rotation transmitting mechanism upon completion of one cycle of operation after engagement thereof with said rotation transmitting mechanism, and further comprising a switch for controlling said tape feeding drive motor, said switch being associated with said selectively engaging member such that it normally assumes a first position but assumes a second position during cyclic operation of said selectively engaging member.

13. A cassette tape recorder as claimed in claim 11, wherein said selectively engaging member includes a gear having a recessed portion formed therein and having a cam formed on a face thereof, and a cam follower member mounted for operation by said cam of said gear, said driving force transmitting member being moved, when said cam follower member is moved by said cam of said gear, by said cam follower member to cause shifting movement of said magnetic head and said pinch roller from the inoperative to the operative positions.

* * * * *